US011908213B2

(12) United States Patent
Povish et al.

(10) Patent No.: US 11,908,213 B2
(45) Date of Patent: Feb. 20, 2024

(54) SYSTEM AND METHOD TO FACILITATE EXTRACTION AND ORGANIZATION OF INFORMATION FROM PAPER, AND OTHER PHYSICAL WRITING SURFACES

(71) Applicant: Acco Brands Corporation, Lake Zurich, IL (US)

(72) Inventors: Bryan Povish, Burlington, WI (US); Juli Hallas, Lake Forest, IL (US); Ming Leung, Ontario (CA); Michael Rowe, Medway, OH (US); Abbey Blundell, Troy, OH (US)

(73) Assignee: ACCO Brands Corporation, Lake Zurich, IL (US)

( * ) Notice: Subject to any disclaimer, the term of this patent is extended or adjusted under 35 U.S.C. 154(b) by 0 days.

(21) Appl. No.: 18/198,685

(22) Filed: May 17, 2023

(65) Prior Publication Data

US 2023/0290164 A1 Sep. 14, 2023

Related U.S. Application Data

(63) Continuation of application No. PCT/US2022/016109, filed on Feb. 11, 2022.
(Continued)

(51) Int. Cl.
*G06V 30/148* (2022.01)
*G06V 30/14* (2022.01)
(Continued)

(52) U.S. Cl.
CPC ... *G06V 30/1448* (2022.01); *G06K 19/06037* (2013.01); *G06V 30/142* (2022.01); *G06V 30/15* (2022.01); *G06V 30/412* (2022.01)

(58) Field of Classification Search
CPC .................. G06V 30/00–43; G06K 19/06037
See application file for complete search history.

(56) References Cited

U.S. PATENT DOCUMENTS

| 5,748,805 | A | * | 5/1998 | Withgott | G06F 40/169 |
| | | | | | 715/236 |
| 7,353,453 | B1 | * | 4/2008 | Simmons | G06F 40/169 |
| | | | | | 345/173 |

(Continued)

FOREIGN PATENT DOCUMENTS

WO 2018048356 3/2018

OTHER PUBLICATIONS

CamScanner, CamScanner App, https://apps.apple.com/us/app/camscanner-pdf-scanner-app/ id388627783, depicting product believed to be publicly available at least as of Feb. 11, 2021, 5 pp.

(Continued)

*Primary Examiner* — Sean T Motsinger
(74) *Attorney, Agent, or Firm* — Fitch, Even, Tabin & Flannery LLP

(57) ABSTRACT

Systems and methods for extracting information from a sheet of material to facilitate organization of information from paper, and other physical writing surfaces are provided. An example system includes a sheet of material and a device for scanning the sheet with an optical sensor. The sheet of material includes an indication region. The indication region allows for indictors to be marked corresponding with at least one a corresponding subregion to be extracted. The sheet of material further includes at least one fiducial mark for identifying a boundary of the sheet. The device includes a processor operably coupled to the optical sensor for causing the optical sensor to scan the sheet and detect a boundary thereof using the fiducial marks and further identify a designated subregion of the sheet. Upon identification of the (Continued)

designated subregion, the processor is configured to extract information contained in the designated subregion for organization of information.

20 Claims, 22 Drawing Sheets

Related U.S. Application Data

(60) Provisional application No. 63/148,924, filed on Feb. 12, 2021.

(51) Int. Cl.
*G06V 30/412* (2022.01)
*G06V 30/142* (2022.01)
*G06K 19/06* (2006.01)

(56) References Cited

U.S. PATENT DOCUMENTS

| | | | | |
|---|---|---|---|---|
| 8,838,591 | B2 | 9/2014 | Hull | |
| 2010/0306698 | A1* | 12/2010 | Sellers | G06F 3/04883 715/863 |
| 2013/0031473 | A1* | 1/2013 | Park | G06F 40/258 715/254 |
| 2016/0088192 | A1* | 3/2016 | Mizuno | H04N 1/60 358/1.9 |
| 2018/0096203 | A1* | 4/2018 | King | G06F 40/109 |
| 2020/0387276 | A1* | 12/2020 | Scholler | G06F 40/169 |

OTHER PUBLICATIONS

EverNote, EverNote App—Document Scanning, https://evernote.com/features/document-scanning, depicting product believed to be publicly available at least as of Feb. 11, 2021, 4 pp.
Hamelin Sas, SCRIBZEE® App, https://apps.apple.com/us/app/scribzee/id1192303022, depicting product believed to be publicly available at least as of Feb. 11, 2021, 4 pp.
Hamelin, Flash 2.0 Index Cards—3"×5", https://www.hamelin.store/collections/flashcards/products/flash-2-0-3x5-flashcards-index-cards-80ct-marine-blues, depicting product believed to be publicly available at least as of Feb. 11, 2021, 3 pp.
Hamelin, Flash 2.0 Index Cards—4"×6", https://www.hamelin.store/collections/4x6-flashcards/products/flash-2-0-4x6-flashcards-index-cards-80ct-turquoise-blue, depicting product believed to be publicly available at least as of Feb. 11, 2021, 2 pp.
Hamelin, One Subject College Ruled Spiral Notebook—7"×10", https://www.hamelin.store/collections/1-subject-college-ruled-7x10-150pgs/products/1-subject-small-college-spiral-notebook-yellow, depicting product believed to be publicly available at least as of Feb. 11, 2021, 2 pp.
Hamelin, One Subject College Ruled Spiral Notebook—8.5"×11", https://www.hamelin.store/collections/1-subject-college-ruled-8-5x11-notebook/products/1-subject-college-spiral-notebook-yellow, depicting product believed to be publicly available at least as of Feb. 11, 2021, 4 pp.
Hamelin, One Subject Graph Ruled Spiral Notebook—8.5"×11", https://www.hamelin.store/collections/1-subject-quad-ruled-4-square-per-inch-8-5x11-150pgs/products/1-subject-graph-spiral-notebook-red, depicting product believed to be publicly available at least as of Feb. 11, 2021, 3 pp.
High Capacity Color Bar Code, Wikipedia, https://en.wikipedia.org/wiki/High_Capacity_Color_Barcode, depicting product believed to be publicly available at least as of Feb. 11, 2021, 4 pp.
International Search Report and Written Opinion for PCT/US2022/016109, dated Jul. 7, 2022 (24 pages).
Moleskine®, Smart Notebook, https://us.moleskine.com/smart-notebook-creative-cloud-connected/p0311, depicting product believed to be publicly available at least as of Feb. 11, 2021, 2 pp.
Olson, E., University of Michigan, AprilTag: A robust and flexible visual fiducial system, https://april.eecs.umich.edu/media/pdfs/olson2011tags.pdf, 2011, 8 pp.
Quizlet, Quizlet App, https://apps.apple.com/us/app/quizlet/id546473125, depicting product believed to be publicly available at least as of Feb. 11, 2021, 5 pp.
Rocketbook, Rocketbook Core Notebook—Dot Grid, https://getrocketbook.com/products/rocketbook-core?variant=7342101758013, depicting product believed to be publicly available at least as of Feb. 11, 2021, 5 pp.
Rocketbook, Rocketbook Core Notebook—Lined, https://getrocketbook.com/products/rocketbook-core?variant=7342101758013, depicting product believed to be publicly available at least as of Feb. 11, 2021, 5 pp.
SCRIBZEE® App, https://www.scribzee.com, depicting product believed to be publicly available at least as of Feb. 11, 2021, 6 pp.
SCRIBZEE®, Template—Seyes, https://www.scribzee.com/wp-content/uploads/2020/05/Réglure-Seyès-A4.pdf, depicting product believed to be publicly available at least as of Feb. 11, 2021, 2 pp.
SCRIBZEE®, Template—5mm Squares, https://www.scribzee.com/wp-content/uploads/2020/03/5x5.pdf, depicting product believed to be publicly available at least as of Feb. 11, 2021, 2 pp.
SCRIBZEE®, Template—Cornell, https://www.scribzee.com/wp-content/uploads/2020/03/Cornell-1.pdf, depicting product believed to be publicly available at least as of Feb. 11, 2021, 2 pp.
SCRIBZEE®, Template—Dotted, https://www.scribzee.com/wp-content/uploads/2020/05/A4-Dot.pdf, depicting product believed to be publicly available at least as of Feb. 11, 2021, 2 pp.
SCRIBZEE®, Template—Plain, https://www.scribzee.com/wp-content/uploads/2020/04/Blank-final.pdf, depicting product believed to be publicly available at least as of Feb. 11, 2021, 2 pp.
SCRIBZEE®, Templat—Ruled, https://www.scribzee.com/wp-content/uploads/2020/03/Ligné-1.pdf, depicting product believed to be publicly available at least as of Feb. 11, 2021, 2 pp.
University of Michigan, The APRIL Robotics Laboratory, AprilTags Visual Fiducial System, Retrieved from the Internet, https://april.eecs.umich.edu/software/apriltag#:~text=AprilTag, 2010, 3 pp.

* cited by examiner

SYSTEM AND METHOD TO FACILITATE EXTRACTION AND ORGANIZATION OF INFORMATION FROM PAPER, AND OTHER PHYSICAL WRITING SURFACES

CROSS-REFERENCE TO RELATED APPLICATIONS

This application is a continuation of International Application No. PCT/US22/16109, filed Feb. 11, 2022, which claims the benefit of U.S. Provisional Application No. 63/148,924, filed Feb. 12, 2021.

FIELD

This disclosure relates generally to a system and method to facilitate extraction and organization of information from paper and other writing surfaces, including, e.g., written notes that may be used to generate a study aid, listing, and/or workflow or organizational tool, and more specifically, to a system and method for identifying and extracting regions of documents or other non-digital writing media.

BACKGROUND

Although the digital world is becoming more and more prevalent in everyday life, paper is still crucial in both the office environment and the school environment for taking notes, such as, e.g., to facilitate knowledge retention. For example, it has been demonstrated that physically writing out notes on paper is beneficial for students in a learning environment to retain information and avoid distraction. It has also been shown that certain individuals learn better when using both digital and non-digital tools for working and/or learning. Numerous research studies have shown a strong relationship between a desire to take notes in a traditional, handwritten format on paper and also store those notes digitally for subsequent review. Individuals may prefer physical note making beyond a learning environment. With the rise of digital devices and communications, physical note making, including calendars, may be an individual's preference, but the physical copy of the notes, writing, photos, figures, graphs, and/or other information may not be accessible at all times. This presents an opportunity for solutions that integrate both paper and digital notetaking and note making.

Mobile applications for use with smartphones or other smart devices are known for imaging and storing digital copies of a user's physical notes. For example, various apps permit a user to utilize a camera associated with their smartphone to scan and enhance a document, e.g., a page from a notebook, and store that digital document for later review. Once scanned, typical applications may apply various basic corrections or enhancements to the image of the sheet such as filtering or de-warping the image.

However, students in a learning environment still often struggle with capturing all the information required to prepare for a test or examination and also struggle with merging both handwritten and typed notes for review. Similarly, in a work environment, a user may take a number of notes or make a number of reminders on a sheet of paper scanned into a digital image, but may not recall which of those notes were important during a later review of the digitized copy. In typical systems, the images produced via the scanning apps are merely static images of the page that a user can look at to review. As such, the currently available offerings do not provide the user with any meaningful way to analyze, review, or extract information from the scanned documents, and only afford the convenience of scanning and saving the documents in a digital medium.

Figure 1:
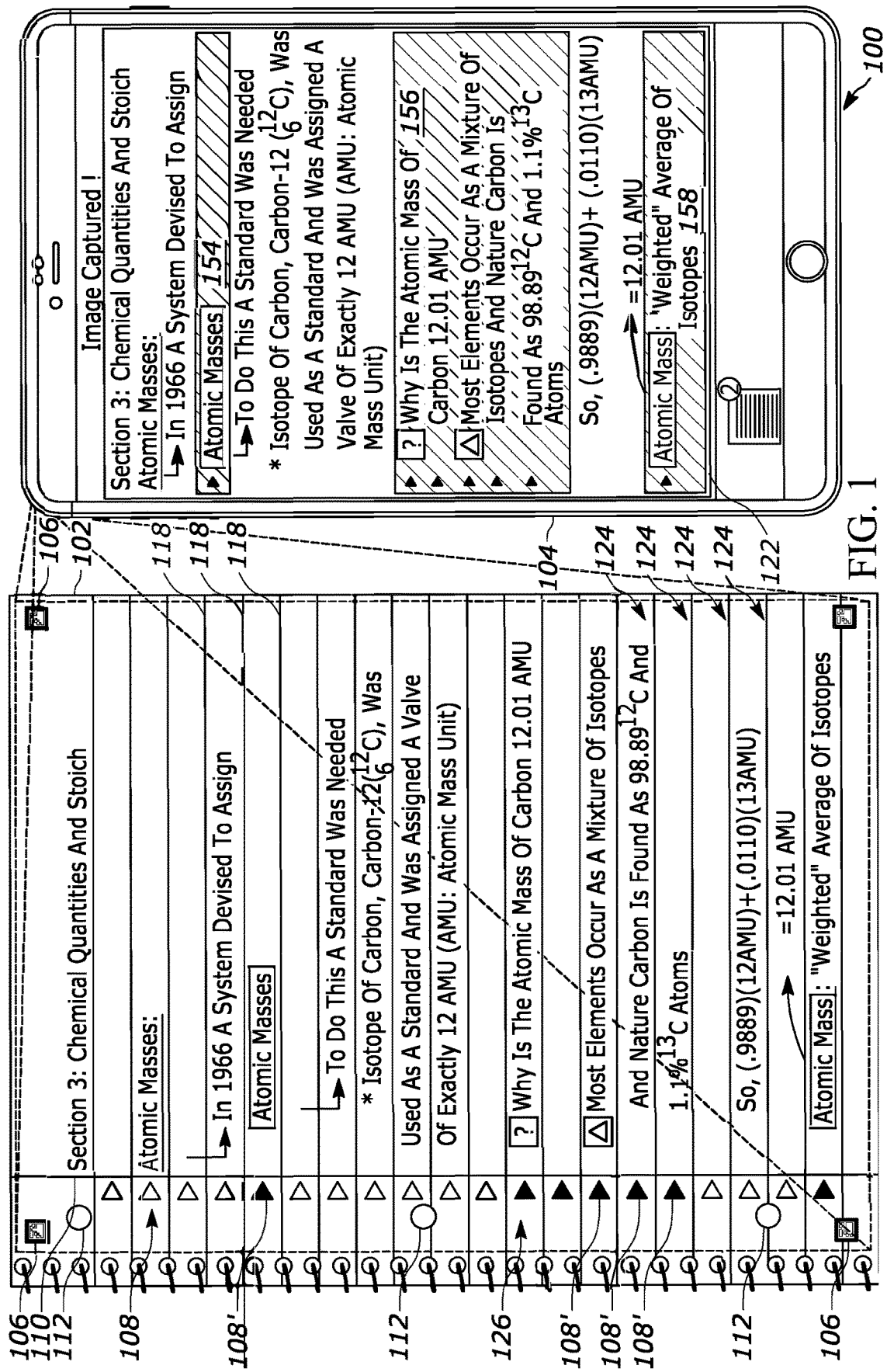
FIG. 1 illustrates an example system having a sheet of material and a device configured to scan the sheet for generating a study aid, the sheet of material having fiducial marks in corners thereof to assist in identifying a boundary of the sheet and a plurality of indicators to assist in identifying subregions of the sheet.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or operations may be described or depicted in a particular order of occurrence while those skilled in the art will understand that such specificity with respect to sequence is not intended to be limiting. Although the sheet of material shown in the drawings is primarily illustrated as a sheet of lined notebook paper, it should be understood that other types of paper or other mediums may also be scanned in the manner provided herein.

DETAILED DESCRIPTION

Generally speaking, systems and methods for extracting information from a sheet of material to facilitate generation of a study aid, listing, workflow organizational tool, email, calendar notice, social media post, and/or other digital work product are provided. An example system includes a sheet of material (such as a piece of paper or another writing surface) and a device for scanning the sheet with an optical sensor. In some embodiments, the sheet of material includes a plurality of subregions and a plurality of indicators each corresponding with at least one of the subregions, and further includes at least one fiducial mark for identifying a boundary of the sheet. While some embodiments disclosed herein incorporate one or more fiducial marks on a writing surface itself, other embodiments incorporate the fiducial mark(s) on a transparent or translucent overlay material to facilitate extraction of information on a sheet or other writing surface placed below the overlay material.

In some configurations, the device includes a processor operably coupled to the optical sensor for causing the optical sensor to scan the sheet and detect a boundary of a scannable region thereof using the fiducial marks and further identify a designated subregion of the sheet or writing surface based on detection of a marked indicator corresponding with the designated subregion. Upon identification of the designated subregion, the processor is configured to extract information contained. In some configurations, the processor extracts the information to create or generate a one or more of the following: a study aid, listing (such as a to-do list), email, workflow organization tool or task, calendar notice or reminder, social media post, a text message, a short message service communication, and/or other digital work product.

So configured, a user may intentionally create one or more marks within an indication area or fill-in the indicators associated with different subregions of the sheet including information that the user desires to subsequently review, e.g., to prepare for a test or review a to-do list. The device is configured to scan the sheet and extract that information based at least in part on detection of the marks within the indication area, such as marked indicators, and the device may automatically generate a digital notecard or other item to be used in a variety of manners. In one illustrative configuration, a user's classroom notes may be scanned, and information therein extracted to make flashcards that may be used to improve the user's memory retention. In this example, this marking and extraction functionality permits students to identify important notes to build a study plan in real-time during a class or lecture. In turn, the study aids generated from the marked information promote effective organization and better studying habits. In another example, the marking and extraction functionally allows a user to create a digital calendar notice or reminder from a physical calendar.

In some forms, the fiducial marks for detecting the boundary of the sheet of material may additionally include encoded data for identifying information associated with the sheet. For example, the fiducial marks may be formed as a machine-readable data matrix such as a quick response (QR) code or an AprilTag having encoded data indicative of, e.g., product information associated with the sheet of material. So configured, the fiducial marks may serve a dual-purpose by both facilitating identification of the sheet boundary for scanning purposes and identifying information about the sheet that may assist in the scanning process and, in some forms, may be provided to a user.

In another aspect, a notebook is provided including a plurality of scannable sheets or pages for being written on by a user. Each of the pages includes at least one fiducial mark in the form of a machine-readable data matrix to both facilitate identification of a boundary of the page and indicate information associated with the notebook as described in further detail below. Each page further includes one or more indicators spaced at least partially along a length of the page, and each indicator corresponds with and is configured to identify at least one subregion of the page. So configured, one or more indicators may be marked by a user to identify one or more designated subregions for extraction to generate a study aid.

In yet another aspect, a method is provided for extracting information from a scannable sheet of material to facilitate generation of a study aid, such as a digital notecard. The method includes scanning a sheet of material having at least one fiducial mark and one or more indicators that each correspond with different subregions of the sheet. The scanning may be performed using an optical sensor of a device such as a smartphone of a user. In connection with the scanning, the processor of the device determines a boundary of the sheet based at least in part on detecting the positioning of the at least one fiducial mark. The processor then determines a designated subregion of the sheet by detecting at least one indicator marked by a user that corresponds with that designated subregion. So configured, the processor extracts information associated with the designated subregion, which may include notes of the user, to generate a study aid.

In yet another aspect, a polymer overlay material containing fiducial marks in the corners thereof may be placed over or fixed to a folder, binder, or a filer. The polymer overlay material may have a slot to allow for insertion of material under the polymer overlay. In some embodiments, the polymer overlay material will include a slot on one side to allow for indication marks to be made by the user to allow for the device to scan the information. In other embodiments, the sheet of material may be marked before insertion under the polymer overlay material.

In yet another aspect, a sheet of material, a dry erase board, a whiteboard, or a notebook may be provided having fiducial marks in the corners thereof, further including pre-designated subregions and function indicators. Upon scanning sheet, a device may determine which subregion contains markings, and further determine if an additional function as marked by one or more function indicators is required. The functions controlled by the function indicators may be selected on the application and are not required for scanning of the subregions.

In yet another aspect, a calendar may be provided having fiducial marks in the corners thereof, further including pre-designated subregions, such as each day of a week or month, and function indicators for each subregion. Upon scanning the sheet, a device may determine which day includes markings, and within the days including markings, if any function indicators have been marked. The function indicators may be selected on the application and are not required for scanning of the days. This may allow a user to functionally digitize a physical calendar and may further allow for reminders among other functions to be created.

Referring now to the drawings, and more particularly FIG. 1, a system 100 is provided including a sheet of material 102 and a device 104 for scanning the sheet of material 102 (e.g., as represented by the dashed lines for ease of illustration) and generating a digital image therefrom. As illustrated, the sheet of material 102 includes a plurality of fiducial marks 106 located in each corner of the sheet 102, a plurality of indicators 108 extending along a left margin 110 of the sheet 102, and information in the form of notes handwritten by a user. In the illustrated embodiment shown, the sheet of material 102 is formed as spiral-bound lined notebook paper including punch holes 112 for being attached to a typical three-ring binding mechanism. In other embodiments, the system 100 may include a sheet of material from a composition notebook, calendar, or planner, among others.

The sheet 102 may be a single page or piece of paper or may be included among a plurality of pages such as in a notebook for use in a school or work environment. Although the sheet of material 102 may be referred to and illustrated herein as lined notebook paper, it should be recognized that the device 104 is configured to digitize and extract information from a variety of written and electronic sources of varying dimensions and varying characteristics. For example, the sheet of material 102 may alternatively be a page of a composition book, a page of engineering paper, a page of graphing paper, or a digital page being displayed on a tablet or other computer screen.

The device 104 is illustrated in the form of a conventional mobile communication device such as a smartphone having a processor 114 and an optical sensor 116 (e.g., a camera) (see FIG. 2) for scanning and extracting information from the sheet of material 102 as described herein. In other forms, the device 104 may be a tablet, portable computer, or scanner similarly configured to scan a sheet of material.

In one aspect, the fiducial marks 106 are printed directly onto the sheet of material 102 to be used as a point of reference for the scanning device 104 to determine a boundary of the sheet 102 for isolating an image of the sheet and removing any background images that may be captured by the optical sensor 116. As shown, in one illustrative configuration, the fiducial marks 106 are positioned in each corner of the sheet 102 to be used by the device 104 for determining location, orientation, and scale of the sheet 102. Although described and illustrated herein as a plurality of fiducial marks 106 located in all four corners of a sheet, less than or more than four fiducial marks 106 may be utilized in connection with the present disclosure. In another aspect, the fiducial marks 106 may be formed as a data matrix such as a QR code or AprilTag including encoded data for identifying information related to the sheet of material 102. For instance, the encoded data may be encoded within the data matrix using a patten provided by an arrangement of a plurality of specific outlines that define a machine-readable portion of the data matrix such that the device 104 may scan the fiducial marks 106 and derive or extract the encoded information therefrom. So configured, the fiducial marks 106 are configured to be detected by the optical sensor 116 of the device 104 and used for both determining a boundary of the sheet 102 and identifying encoded information associated with the sheet 102.

In connection with the fiducial marks 106, the device 104 may additionally identify and utilize other features of the sheet 102 for localization purposes via a mobile application installed on the device 104. For example, the device 104 may be configured to identify other distinguishing features of the sheet 102 such as the positioning of the punch holes 112, the horizontal lines 118 extending across the sheet 102, and/or the margins of the paper (e.g., margin 110) to establish the proper orientation of the sheet when scanning. So configured, the device 104 may determine a left or right side of the paper and determine whether the paper is upside-down while being scanned.

The indicators 108 extending longitudinally along the left margin 110 of the sheet 102 are illustrated in FIG. 1 as fillable triangles. In alternative embodiments, the indicators 108 may be formed in other shapes as described in further detail with respect to FIGS. 9A-9C below. For purposes of identifying and extracting information from the sheet 102, each of the plurality of indicators 108 is associated with a different subregion of the sheet 102 (e.g., subregions 154, 156, and 158 as discussed below with respect to FIG. 4). With reference to FIG. 1, each of the plurality of indicators 108 corresponds with a different line 124 of the lined notebook paper that may, or may not, include written notes of a user.

In some forms, the indicators 108 may be positioned on other areas of the sheet such as adjacent the right margin 120 or immediately adjacent an edge of the sheet along a longitudinal axis. For other styles or types of paper, such as engineering or graph paper, the indicators 108 may be positioned in other areas of the sheet such as aligned along a lateral or horizontal axis so as to correspond with vertically oriented subregions of the sheet.

As described above, a user may mark or otherwise identify certain indicators of the plurality of indicators 108 to designate corresponding subregions of the sheet 102 to be extracted by the device 104 after the sheet has been scanned. For example, in the illustrated form, the indicators 108' have been marked by a user by darkening, shading, or filling in the triangular shapes with a pencil or other writing utensil which is in turn detected by the device 104 to identify subregions that have been designated by a user. As shown on the user interface 122 of the device 104 in FIG. 1, the marked indicators 108' correspond with subregions of the sheet 102 to be extracted as indicated by the slightly shaded regions.

In some instances, a user may desire to subsequently review information (e.g., notes taken) that may span more than a single line of the sheet 102 such as a larger formula or a longer definition. In one aspect, consecutive indicators 108 immediately adjacent one another may be marked by a user to identify a plurality of adjacent, corresponding subregions of the sheet to be combined into a larger subregion (e.g., subregion 156 as shown on the user interface 122) and extracted together by the device. For example, the marked indicators 126 corresponding to different individual subregions (e.g., lines 124) have been marked by a user in the manner described above to indicate that each of these adjacent subregions contains information the user desires to combine. So configured, when the device 104 detects two or more consecutively marked indicators 108, the subregions corresponding with those indicators may be extracted together, e.g., in the form of a single cropped image.

So configured, the subregion to be extracted from the sheet 102 may consist of a single line, multiple lines, or an entire page if desired depending on which indicators 108 the user has marked or identified. In this way, multiple key items of information designated by a user may be automatically extracted from a single notebook page or image capture to generate multiple study aids therefrom.

Figure 2:
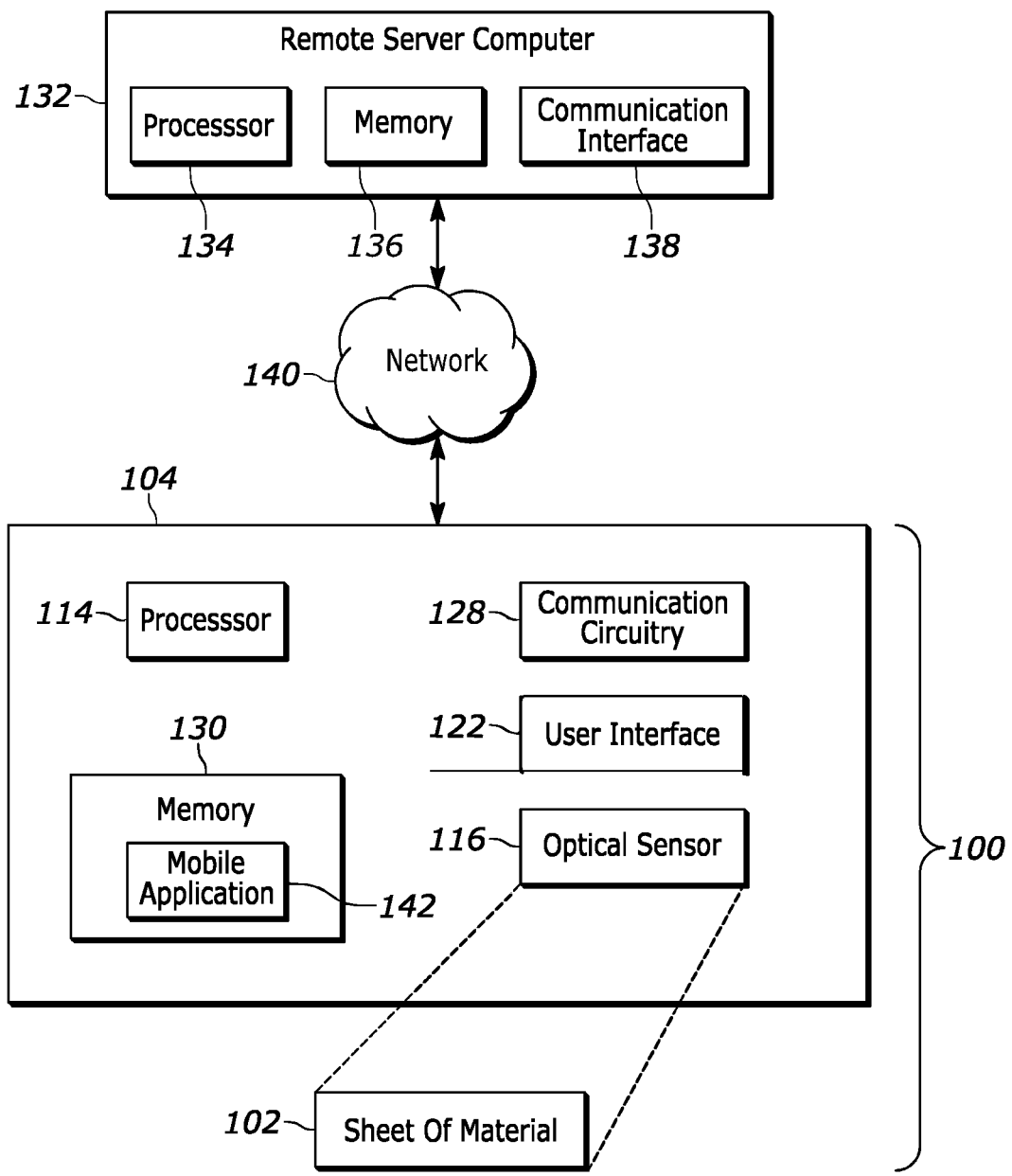
FIG. 2 is a schematic diagram of the example device of FIG. 1 configured to scan the sheet of material, the device having a processor, communication circuitry, a memory, a user interface, and an optical sensor, and the device able to communicate with a remote server computer via a network.

Referring now to FIG. 2, a schematic diagram is shown illustrating various example components of the device 104 including a processor 114, an optical sensor 116, a user interface 122, communication circuitry 128, and a memory 130. In one aspect, the device 104 is operable to scan the sheet 102 using the optical sensor 116 (e.g., a camera). The optical sensor 116 may be integral with the device 104, or alternatively, may be coupled to the device 104 via a wired or wireless connection. As shown, the communication circuitry 128 of the device 104 is configured to communicate with a remote server computer 132 having a processor 134, a memory 136, and a communication interface 138 via a network 140, such as the internet.

A mobile application 142 may be downloaded or installed in the memory 130 of the device 104 by a user to facilitate the scanning and extraction features as described herein. For instance, the application 142 may guide or instruct the user how to scan and store a sheet of material 102 that the user would like to digitize. For example, as shown in screenshot 139 (left) in FIG. 3, the application 142 may enter an "image capture" mode in which the user is prompted to scan a sheet such as a page of a notebook. Multiple sheets may be captured in quick succession. The user interface 122 of the device 104 may display an instruction or prompt 141 for the user to align the optical sensor 116 with the page (e.g., "Looking for Corner Marks") such that the fiducial marks 106 in the corners thereof are readily detectable by the device 104. Once the optical sensor 116 has been properly aligned, the device 104 automatically captures an image of the sheet 102. Alternatively, a user may be prompted to manually interact with a button via the user interface 122 to capture the image. In some forms, the application 142 presents the user with an option 144 to store the sheet in a selected location (e.g., a subject in school such as math, science, etc.) for saving the scanned image of the sheet 102. Based on the selection of the user with respect to option 144, the image of the sheet 102 may be stored in the selected location and be subsequently accessible via the application 142 to retrieve any scanned sheets 102 that the user desires to review. As shown in screenshot 150 (right) of FIG. 3, the selected locations of the user may be displayed in the application 142 as a collection of tiles such that that a specific tile may be selected by the user to review all scanned documents and study aids saved in that selected location.

After the image has been captured by the optical sensor 116 of the device 104, the processor 114 may be configured to correct and enhance the image by, for example, dewarping the image, cropping the image to remove background noise, correcting skew, rotating and vertically aligning the image, amplifying contrast, removing shadows, whitening the image, or adjusting lighting. Alternatively, the processor 114 may cause the communication circuitry 128 to communicate the image to the remote server computer 132 via the network 140 and the processor 134 of the remote server computer 132 may be configured to perform some or all of the corrections and enhancements of the image described above.

In some forms, the processor 114 of the device 104 is configured to store the scanned images in the local memory 130, and in other forms the processor 114 may additionally or alternatively be configured to cause the communication circuitry 128 to communicate the scanned images to the remote server computer 132 for storage in memory 136 such as a database. Once the image of the sheet has been saved, the application 142 may permit the user to manually adjust edges of the images, crop, adjust contrast, brightness, and shift between grayscale or color via the user interface 122 of the device 104. Further, additional post-processing editing tools could be included, such as underlining, circling and highlighting for the user to emphasize various portions of the image or portions of a study aid generated therefrom.

Figure 4:
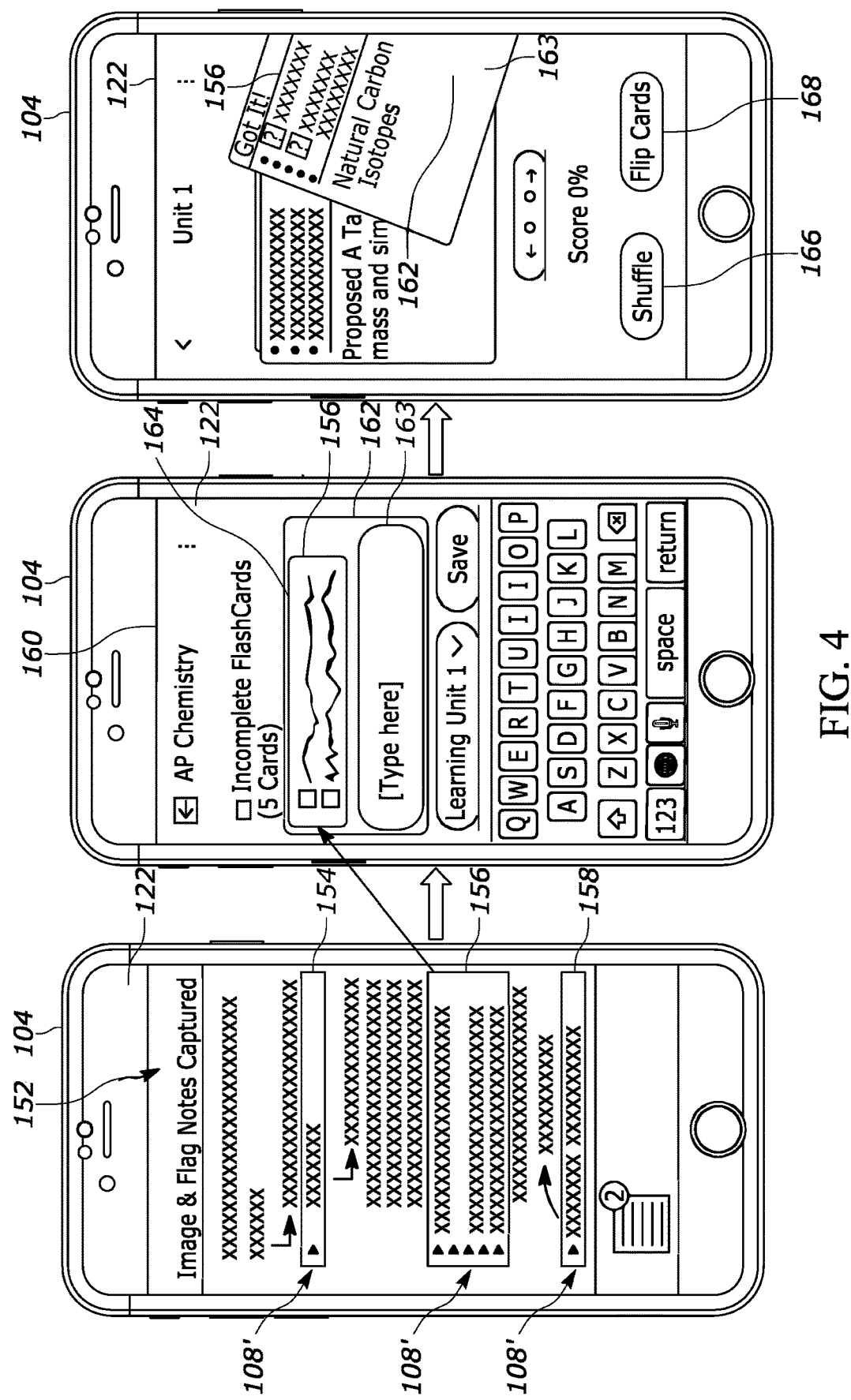
FIG. 4 illustrates additional example screenshots of the application installed on the device of FIG. 1, the screenshots pertaining to the generation of a study aid by extracting information from an image of a scanned sheet.
Figure 5:
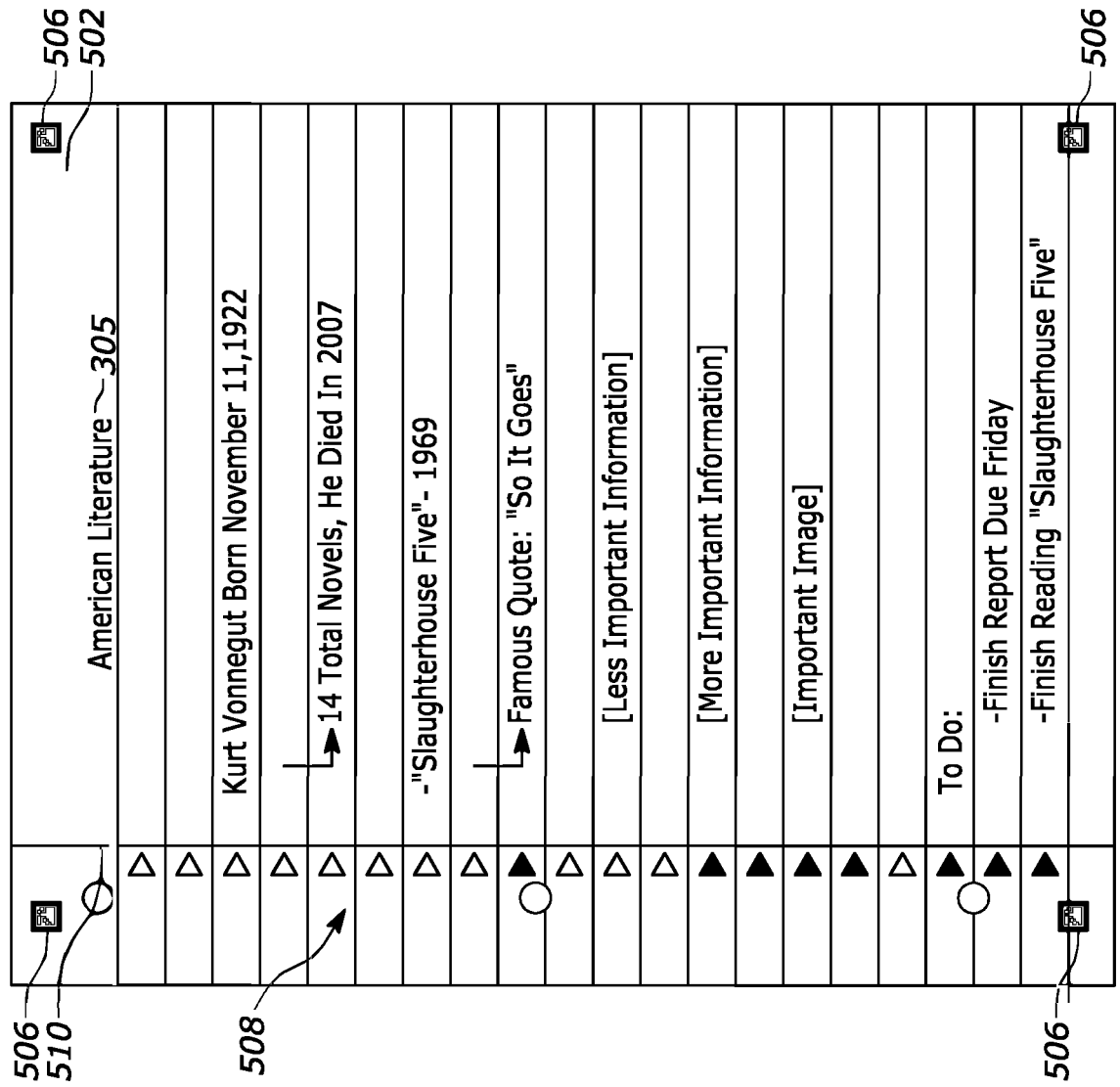
FIG. 5 illustrates an example sheet of material to be scanned by a device, the sheet of material having fiducial marks arranged in corners thereof and a plurality of indicators aligned along a longitudinal margin corresponding with different lines of the sheet, where selected indicators have been marked by a user.

Referring now to FIG. 4, the identification and extraction of designated subregions of the sheet 102 based on the detection of indicators 108 marked by a user to generate an example study aid will be described. As shown in the leftmost screenshot 152, the image of the sheet 102 has been captured using the optical sensor 116 of the device 104 and may additionally have been enhanced and/or refined in the manner described above. Once the image of the sheet 102 has been captured, the processor 114 of the device 104 is configured to detect designated subregions of the sheet based at least in part on detection of marked indicators 108' corresponding with those subregions being marked by a user. For example, as shown in screenshot 152, the processor has identified three distinct subregions 154, 156, 158 (as indicated by the light grey boxes overlaying the text) including information (e.g., notes) to be extracted based on the presence of marked indicators 108'.

As described above, the subregions may be of varying sizes based on the marking of consecutive indicators 108 by a user. For instance, the subregion 154 only includes a single line of text, whereas the subregion 156 includes five lines of text and has been combined into a larger subregion resulting from the five consecutive and corresponding marked indicators 108'. So configured, the user may designate multiple subregions in this manner that are separated by at least one non-marked indicator to generate a number of unique notecards from a single scanned sheet.

Upon identification of one or more subregions designated by the user (e.g., subregions 154, 156, 158), each designated subregion may be extracted from the image of the sheet 102 by being cropped therefrom, and the cropped image may be used to generate a study aid such as a notecard or flashcard as shown in the screenshot 160 (center). As illustrated, the subregion 156 including multiple lines of text has been cropped from the image of the sheet 102 and placed in the digital notecard 162 such that the information within the subregion 156 is now shown. In some forms, the user may be permitted to add to, modify, or delete information included on the digital notecard 162 via the user interface 122 of the device 104. For example, the digital notecard 162 may include multiple sections 163, 164, and section 163 may be a fillable section for a user to enter their own additional text or notes via the user interface 122 (in the area marked "Type Here"). In one non-limiting example, a user may designate an important definition written on the sheet 102 but the actual word associated with that definition may not have been included. Once extracted into the notecard format as provided in notecard 162, the user may subsequently add the actual word associated with the definition to complete the notecard 162 for quizzing or reviewing purposes. The other designated subregions of the sheet (e.g., subregions 154 and 158) may likewise be cropped from the image of the sheet 102 in a similar manner and used to generate an additional study aid.

Although the study aid in the form of digital notecard 162 is shown as a single-sided notecard having portion 163 including information from a designated subregion and fillable portion 164, the notecard 162 may be formed in a variety of selectable manners and layouts to permit a user to customize the study aid as desired. For example, a user may select a double-sided notecard format, or a notecard with additional editable or fillable portions for adding additional information or details.

In one aspect, the user interface 122 may permit the user to delete the cropped image of the designated subregion placed in portion 164 of the digital notecard 162 and replace the image with their own written text. For example, a user may quickly write down important information on the sheet 102 but may be aware that such information is not entirely complete or could be wrong and the user needs to double-check that information later. The user may nevertheless mark the indicator or indicators associated with the subregion(s) containing that questioned information such that the information is still automatically extracted and placed in a notecard 162 as a reminder to correct or modify the notecard 162 at a later time. This may include deleting the cropped image and replacing it with text, or additionally or alternatively adding clarifying text to a different portion of the notecard 162. In some forms, the application 142 may be configured to perform optical character recognition (OCR) on the information contained in the subregion on the notecard 162 such that the user may be permitted to edit the notes extracted from the sheet 102.

As used herein, a study aid is used to denote a variety of learning tools. Indeed, in addition to learning tools such as notecards and flashcards described in the embodiments above, the application 142 may likewise generate other forms of study aids such as outlines, practice tests, and other study-related material to assist a user in preparing for a test or examination, or otherwise learning material found on the sheet of material.

In addition to study aids, the systems described herein also may be employed to generate other listings, reminders, and/or other workflow or organizational tools. For example, the fillable indicators 108 may be included with a calendar or planner that may be scanned to create a list of follow-ups or reminders. Indeed, these teachings may be employed to generate a number of learning, workflow or organizational tools.

Figure 3:
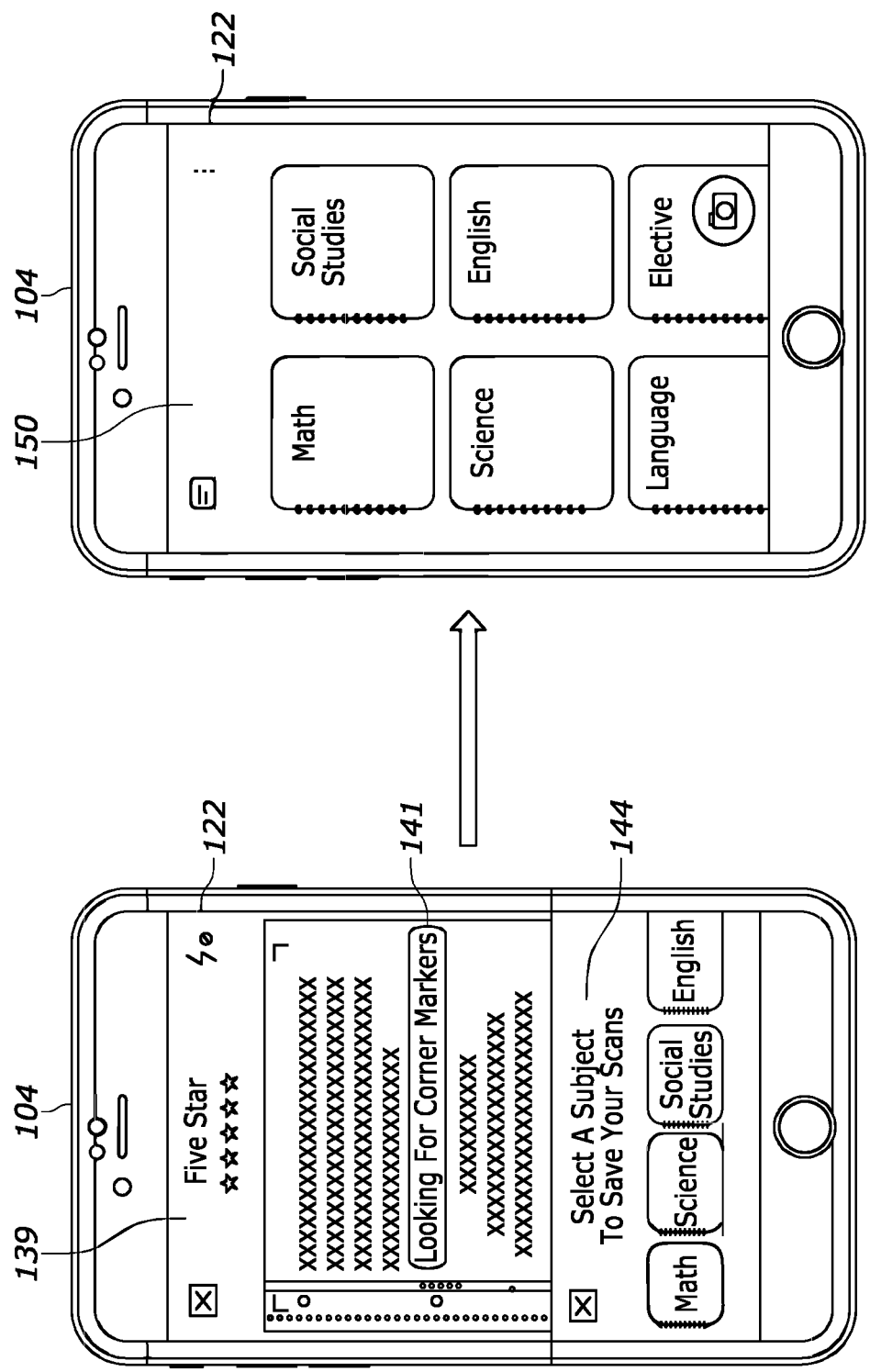
FIG. 3 illustrates example screenshots of an application installed on the device of FIG. 1, the screenshots pertaining to scanning and storing images of the scanned sheets in user-selected destination locations.

After the study aid, such as notecard 162 shown in the screenshot 160, has been marked as completed or saved by the user via the user interface 122, the notecard 162 may be saved to a specific folder, such as the selected locations corresponding with subjects explained with respect to FIG. 3, and the mobile application 142 may provide a quizzing feature through which the user may digitally flip through a deck of single- or double-sided notecards to quiz themselves on the information contained. This quizzing feature is shown in screenshot 164 (right). In some forms, the user may shuffle the deck of notecards to randomize the ordering via the user interface 122 by pressing the "Shuffle" button 166. In embodiments where the user has generated double-sided notecards (e.g., with a question on one side and an answer on the opposite side), the user may select the "Flip Cards" button 168 to flip the deck of cards over so the user can see the opposite side of the notecards first. Users may also be presented with an option to mark specific notecards as "known" to remove those notecards from the deck in the event the user assesses that they have adequately memorized the information contained therein. In some forms, the application 142 is configured to provide a user's score indicating how many notecards were memorized or answered correctly or incorrectly during a review session.

In some embodiments, the user may desire to share their saved study aids with other individuals. For example, the user may be working on a group project or studying together with a larger group of individuals such that it would be beneficial for all members of the group to have access to the study aids generated using the information in the subregions extracted from the sheet 102. In one aspect, the application 142 may present the user with a "Share" option by which the user may share the study aids with another user via, e.g., a text, a link, or other communication configured to provide access to the study aids that have been saved by the user either in the local memory 130 of the device 104 or the memory 136 of the remote server computer 132.

Referring now to FIGS. 5-8, various steps in analyzing an example sheet of paper to extract information therefrom for generating a study aid will be described in further detail. For example, with reference to FIG. 5, an example sheet 502 is shown that is substantially similar to sheet 102 shown in FIG. 1 such that any differences will be described herein-after. As illustrated, sheet 502 includes a plurality of fiducial marks 506 located in each corner of the sheet 502, a plurality of indicators 508 extending along a left margin 510 of the sheet 502, and information in the form of notes handwritten by a user. Various ones of the indicators 508 have been marked by a user that correspond with subregions of the sheet including information that the user desires to extract therefrom.

Figure 6:
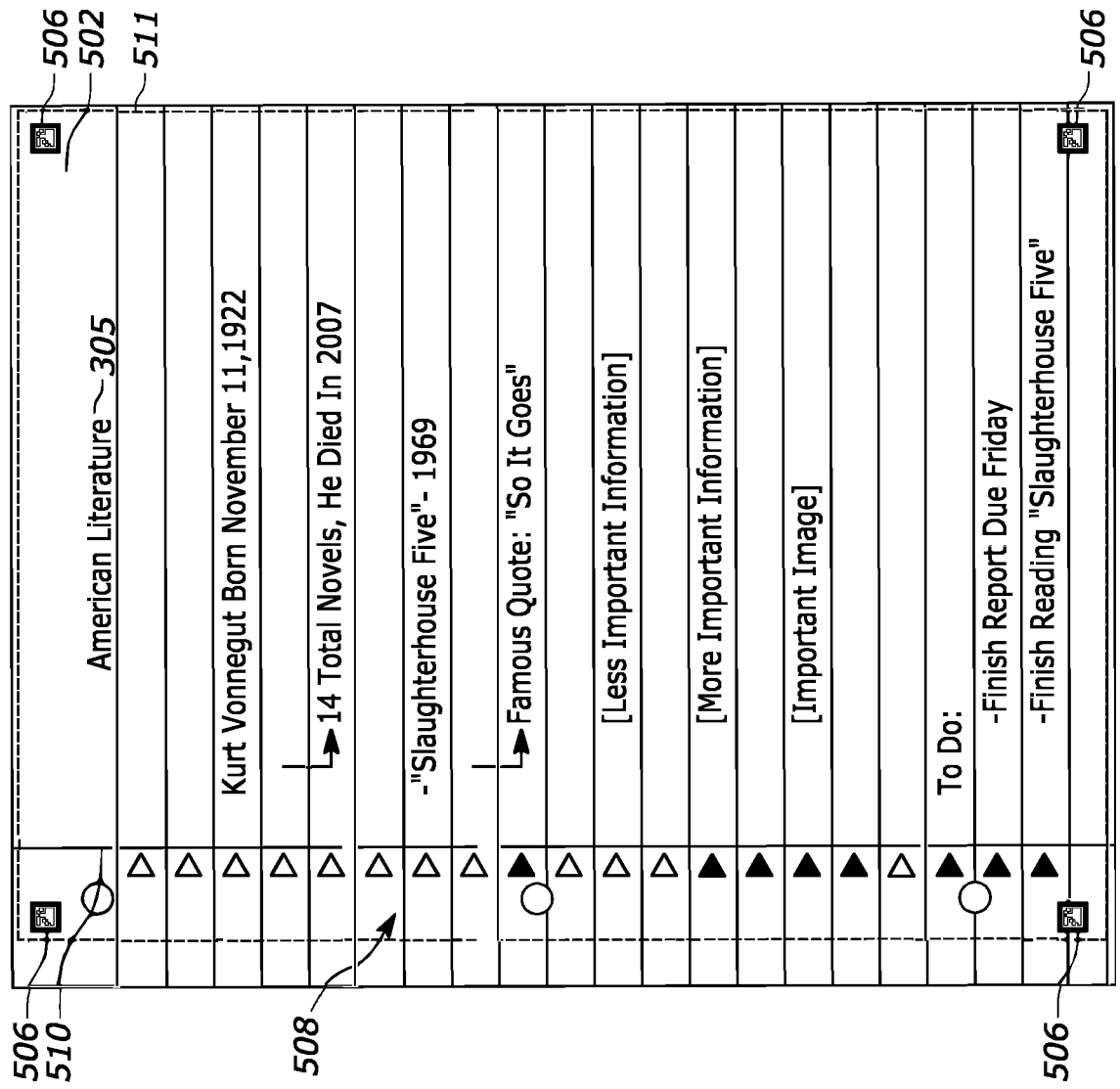
FIG. 6 illustrates the example sheet of FIG. 5, showing a detected boundary of the sheet as identified by the device based at least in part on the fiducial marks.

Referring to FIG. 6, via the mobile application 142 installed on the device 104 (shown in FIG. 1), the user may scan the sheet of material 502 using the optical sensor 116 thereof to determine a boundary 511 of the sheet 502 for saving the sheet 502 as an image. As illustrated, the detected boundary 511 of the sheet 502 is designated using a dashed box overlayed on the sheet 502 for ease of illustration. The processor 114 of the device 104 is configured to identify the boundary 511 of the sheet 502 based at least in part on detection of the fiducial marks 506 in the form of data matrices positioned in the four corners of the sheet 502, and is configured to filter out background information such that only the area of the sheet 502 within the boundary 511 is saved as an image.

Figure 7:
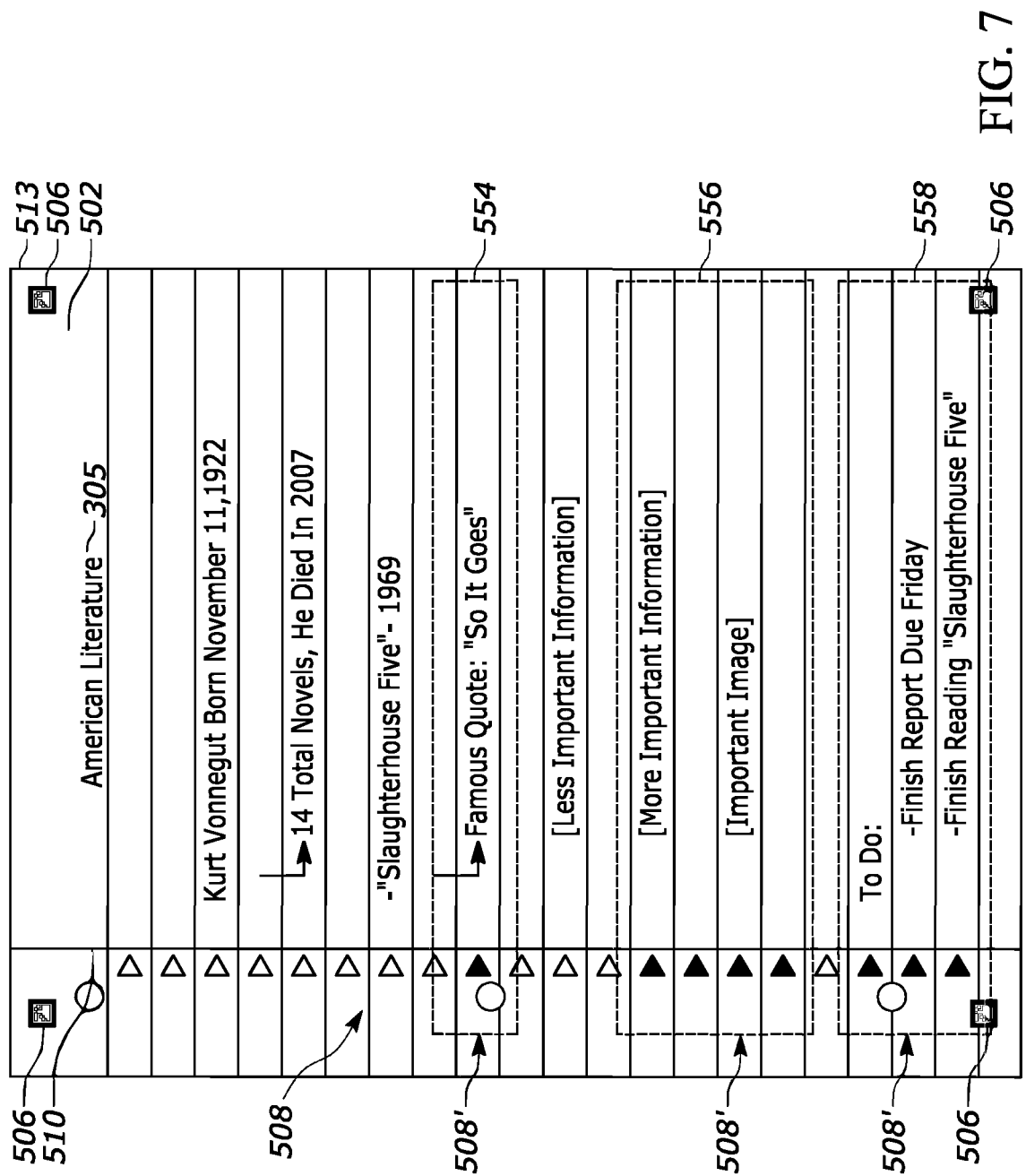
FIG. 7 illustrates an image of the example sheet of FIG. 6 showing a plurality of designated sub-regions of the sheet as identified by a processor of the device based at least in part on the corresponding indicators being marked by a user.

Referring now to FIG. 7, once the image 513 of the sheet 502 has been generated by the application 142, designated subregions of the sheet 502 may be identified by the processor 114 using said image 513. Each of the indicators 508 corresponds with a different subregion of the sheet 502, and various indicators 508 have been marked by a user on the sheet (marked indicators 508') to designate that information within the subregion should be extracted for generation of a study aid. For example, in FIG. 7 the user has marked various indicators 508' associated with subregions of varying sizes such as subregion 554 including a single line, combined subregion 556 including five lines, and combined subregion 558 including three lines. In one form, the processor 114 may be programmed to expect and attempt to detect user markings in specific locations on the sheet 502 based (e.g., along the left margin 510). In some embodiments, a histogram may be generated and analyzed to determine a normalized color of the specific locations and a threshold filter may be applied to determine whether an amount of darker pixels (e.g., indicating shading or another form of user marking) are detected. In one form, the processor 114 is configured to determine that an indicator 508 is "marked" for subregion extraction purposes based on more than about 30% of the pixels in the expected location being darker.

Once the designated subregions have been identified by the processor 114, the processor 114 is configured to crop and extract those designated subregions from the larger image of the sheet 502 for generation of a study aid as described above with respect to FIG. 4. For subregion 554, only a single line is extracted. However, for subregions 556 and 558, since consecutive marked indicators 508' have been detected, the subregions associated with those indicators may be combined into a single subregion and extracted as a single image. In order to inhibit inadvertent cropping of hanging letters and/or to accommodate for sloppy handwriting, the processor 114 is configured to crop a slightly larger area above and below the designated subregions (e.g., about 1 mm to about 5 mm) such that the entirety of the information that the user intends to designate may be extracted and no information is accidently lost.

Figure 8:
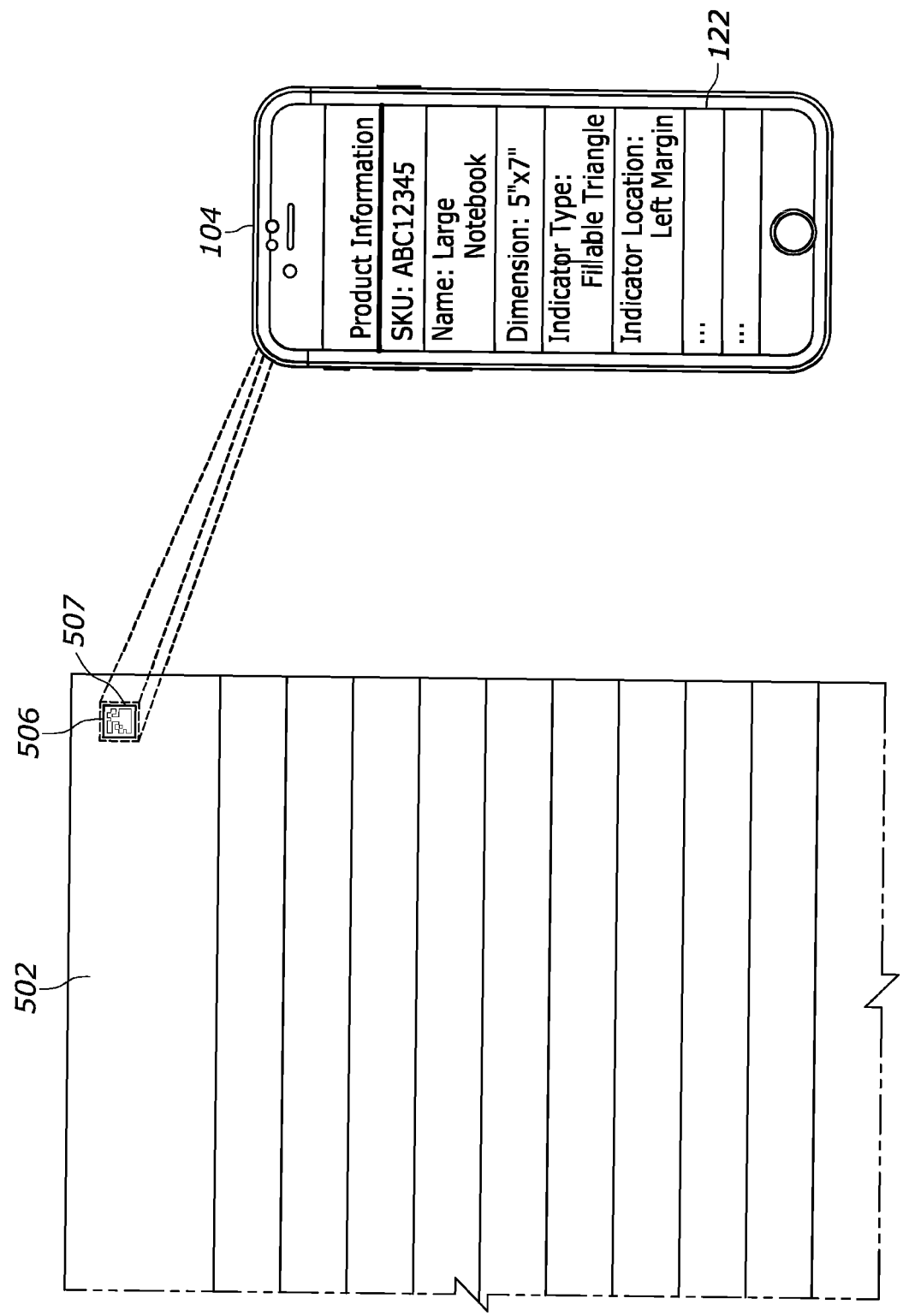
FIG. 8 illustrates a device scanning a fiducial mark in the form of a data matrix on an example sheet of material to determine and display information associated with the sheet of material based on encoded data of the data matrix.

The functionality of the fiducial marks 506 is described in further detail with respect to FIG. 8. Although the fiducial marks 506 may be in the form of a simple polygonal shape (not shown) to be detected by the optical sensor 116 of the device 104 to identify the boundary 511 of the sheet 502, the fiducial marks 506 may beneficially be provided as a machine-readable data matrix 507 such as a quick response (QR) code or AprilTag printed on the sheet 502 including encoded data that may be used to provide information to the user or assist in the scanning of the sheet 502. Depending on the size of the bit pattern within the data matrix 507, variable different data payloads may be achieved for delivering various different types of information. For example, such encoded information identifiable via the fiducial mark 506 may include a reference indicating a stock keeping unit (SKU) of the sheet or a product associated with the sheet (e.g., a notebook). In one aspect, the reference indicating the SKU of the sheet or product may be an alphanumeric reference value corresponding with the SKU such that the entire SKU need not be encoded in the fiducial mark 506 which in turn reduces the required data payload. In one example, a detected reference value "1" may correspond with product SKU ABC123, whereas a different detected reference value "2" may correspond with product SKU DEF456. As such, the processor 114 may be configured to detect the reference value from the fiducial marks 506, compare that reference value to a known list of reference values and corresponding SKUs, and determine the SKU of the product for the user. In other aspects, the encoded information of the fiducial marks 506 may include the name of a product associated with the sheet, the dimensions of the sheet, the margins of the sheet, the positioning of hole punches in the sheet, the type of indicators printed on the sheet, and the location of the indicators printed on the sheet, where such information may similarly be represented by corresponding reference values.

In still other forms, the fiducial marks 506 may additionally or alternatively include an ordinal reference indicative of an orientation of the sheet to assist the processor 114 in determining whether the sheet being scanned is in a "landscape" or "portrait" orientation. For example, to effectuate the generation of study aids as described herein, it may be beneficial to determine the orientation of the sheet to detect the location of the indicators corresponding with various subregions. In one form, the top left fiducial mark 506 on the sheet may include an alphanumeric reference value such as "100" and the bottom right fiducial mark 506 on the sheet may include a different alphanumeric reference value such as "101" such that the processor 114 may detect both and determine that the sheet is in the "portrait" orientation based at least in part on the expected positioning of those fiducial marks in the respective top left and bottom right positions.

When the sheet 502 including the fiducial marks 506 is initially scanned, the processor 114 of the device 104 may be configured to scan and analyze the data matrix 507 of the fiducial mark 506 to identify the encoded data and derive information therefrom in addition to using the fiducial mark 506 for localization of the sheet boundary 511. In some forms, the device 104 may be configured to present information derived from the encoded data to the user as shown on the user interface in FIG. 8. By providing the SKU or product name to the user, the user may be able to more easily identify and reorder the same notebook if desired.

Additionally or alternatively, the information derived from the encoded data may be used in connection with the scanning and identification of subregions designated by a user, and/or assisting in identifying the orientation of the sheet as described above. For example, the optical sensor 116 and processor 114 may be configured to expect and detect a location of the plurality of indicators 508 based at least in part on the identification of the product SKU indicated by the fiducial mark 506 (e.g., based on an alphanumeric reference). In one aspect, the fiducial mark 506 may indicate that the sheet 502 is listed as "Product A" having dimensions of "X" by "Y" and including an indicator type "Z" such that the processor 114 may be configured to attempt to locate and detect the indicators 508 based on this product information. With reference to sheet 502 shown in FIG. 5, the information encoded in the fiducial marks 506 may indicate that the indicators 508 are of a triangular type and are aligned along a left side of the left margin 510 of the sheet 502. The processor 114 may first attempt to identify an orientation of the sheet 502, and may then attempt to detect marked indicators 508' to identify designated subregions based on such information. In some forms, if one or more indicators 508 are not detected in the location expected by the processor 114 based on the information derived from the data matrix 507, the application 142 may return an error message and notify the user via the user interface 122 with a notification stating, e.g., "the indicators are not detected in the expected location; please try to scan the sheet again."

Figure 9A:
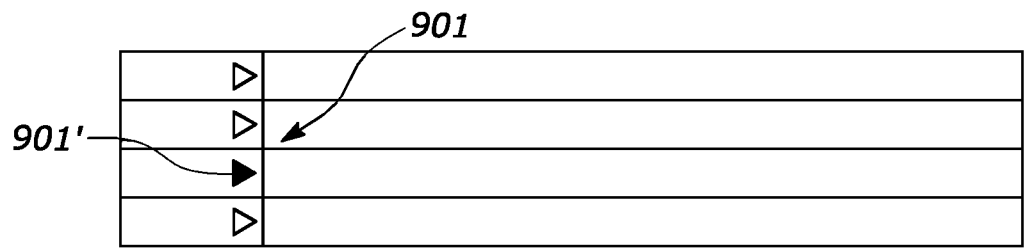
FIGS. 9A-9C illustrate various embodiments of example indicator types for use in identifying designated subregions of a sheet of material.
Figure 9B:
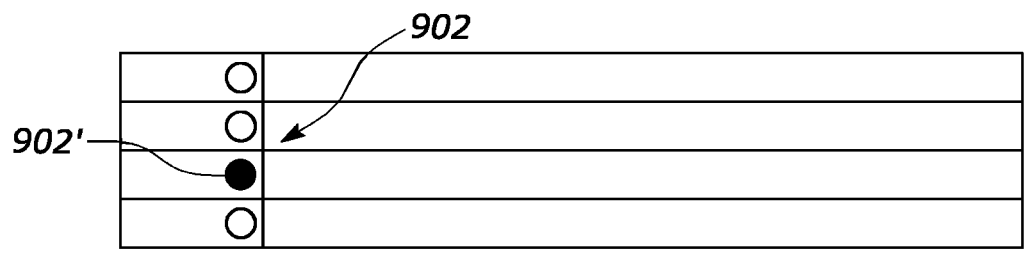
Figure 9C:
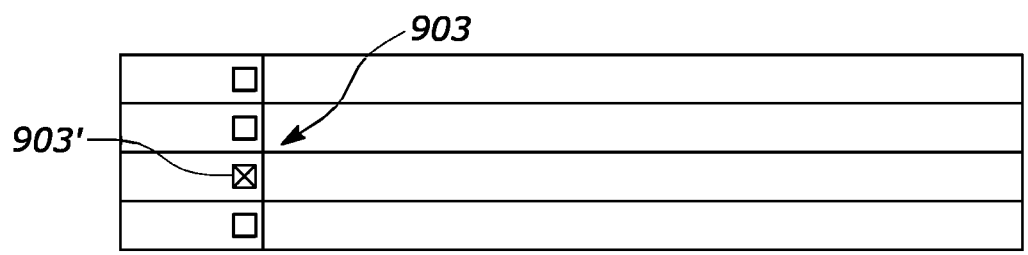

FIGS. 9A-9C show various example types of indicators that may be used in connection with the present disclosure. For example, FIG. 9A shows example indicators 901 in the form of fillable triangles to be marked by a user by shading in the triangle with a writing utensil as illustrated (marked indicator 901'). In another example, as shown in FIG. 9B, the indicators 902 are in the form of fillable circles where one of which (902') has been shaded in and marked by a user. With respect to FIG. 9C showing indicators 903 in the form of a square box, it should be understood that the indicator need not necessarily be marked by being filled in or shaded by the user. Specifically, the user may mark a specific indicator such as indicator 903' to designate a corresponding subregion of the sheet for extraction by making an "X" as shown, or alternatively shading, including a check mark, circling the indicator, or the like.

Figure 10:
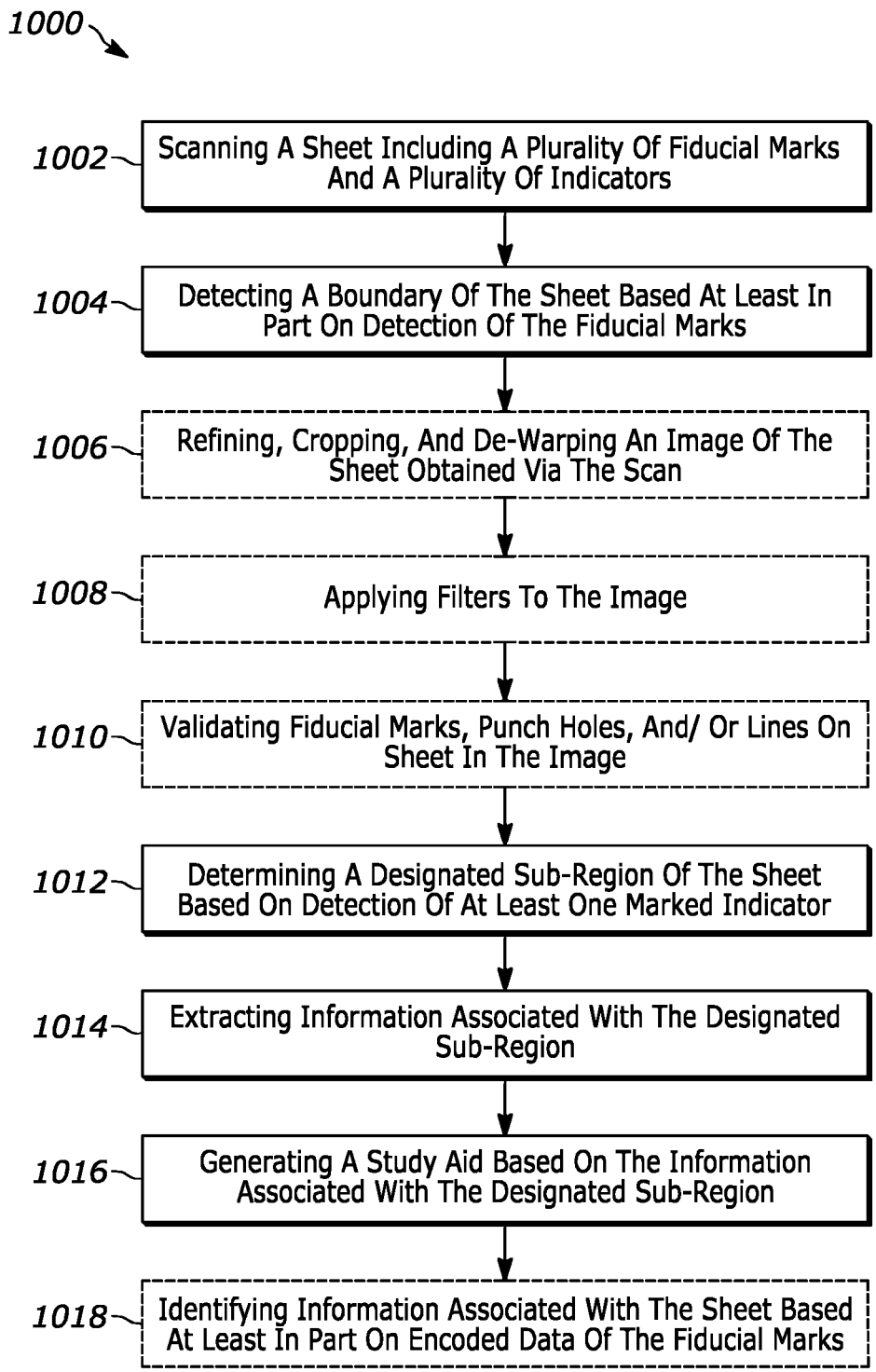
FIG. 10 is a flow chart of an example method for identifying and extracting information from a scannable sheet to generate a study aid.

Referring now to FIG. 10, an example method 1000 is provided for extracting information from a scannable sheet of material to facilitate generation of a study aid, such as a digital notecard. In step 1002, the method includes scanning a sheet of material including a plurality of fiducial marks and a plurality of indicators each corresponding with a different subregion of the sheet using an optical sensor of a device. In connection with the scanning, in step 1004, the method includes detecting a boundary of the sheet using a processor of the device based at least in part on detection of the fiducial marks. The device is configured to generate an image of the sheet via the scanning as described in further detail above. The method may optionally include step 1006 of refining, cropping, and de-warping the image of the sheet obtained via the scan. Additionally, the method may optionally include step 1008 of applying filters to the image and step 1010 of validating (i.e., detecting) fiducial marks, punch holes, and/or lines on the sheet in the image to facilitate localization and detection of the indicators of the sheet.

Once the image has been scanned and optionally conditioned, in step 1012, the method includes the processor determining a designated subregion of the sheet based at least in part on detection of at least one marked indicator corresponding with the designated subregion. Thereafter, in step 1014 the method includes extracting information associated with the designated subregion and in step 1016 the method includes generating a study aid based on the information extracted from the designated subregion. Optionally, the method may include step 1018 of identifying information associated with the sheet based at least in part on the encoded data of the fiducial marks. Although the method 1000 is described with respect to extracting information from a single designated subregion, it should be understood that a larger subregion corresponding with consecutively marked indicators marked by a user may likewise be determined and extracted in a similar manner.

Figure 11:
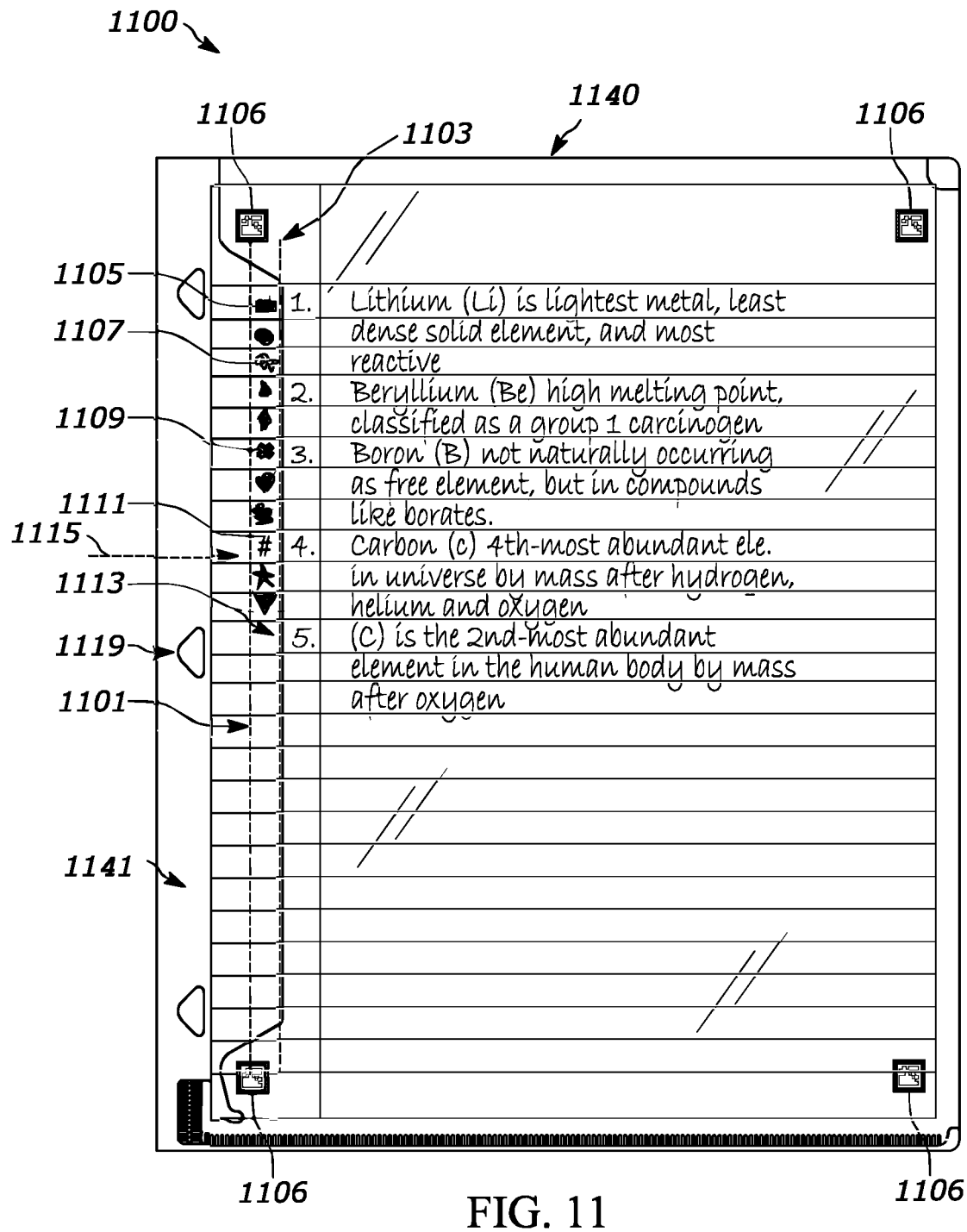
FIG. 11 illustrates an embodiment of a system having a polymer overlay material on a face of a folder to be scanned by a device, the polymer overlay material having fiducial marks arranged in corners thereof and forming a slot to allow for left-side horizontal insertion of a sheet of material.

Referring now to FIG. 11, a folder 1100 with polymer overlay material 1140, such as a cover, is shown illustrated on a face the folder. The polymer overlay material 1140 allows for the insertion of a sheet of material 1141 underneath the polymer overlay material 1140, creating an at least partially transparent pocket panel or pocket structure. As discussed below, the polymer overlay material 1140 may be disposed on a folder, binder, notebook, or filer. The polymer overlay material 1140 may be disposed on the face of the folder, as illustrated in FIG. 11. A sheet of material 1141 may be disposed underneath the polymer overlay material 1140. The polymer overlay material 1140 may be transparent or substantially transparent such that text, handwriting, or some other marking on the sheet of material disposed beneath the polymer overlay material 1140 can be scanned by the optical sensor. This creates at least a partially transparent pocket panel connected to the folder 1100.

The polymer overlay material 1140 is attached to the folder 1100 substantially on three sides, such that the final side, the left side, allows for the horizontal insertion of a sheet of material, as illustrated by the insertion arrow 1115. The polymer overlay material 1140 includes at least one fiducial mark 1106, similar to those described above with reference to FIG. 1. In the present embodiment, the fiducial marks 1106 are disposed in the corners of the polymer overlay material 1140. The fiducial marks 1106 allow for a visual indication to the user of the region of the sheet of material 1141 that will be scanned by the optical sensor. The fiducial marks 1106 guide the optical sensor and/or application of the region to be scanned. The region to be scanned, or scannable region within the boundary, spans from the middle of the inner surface of each fiducial mark 1106. For example, the top right fiducial mark 1106 may define one corner of the scannable region. A top boundary may be defined from the middle of the left edge of the top right fiducial mark 106 extending horizontally therefrom. A side, in this illustrative example the right side, boundary may be defined from the middle of the bottom edge of the top right fiducial mark 106 extending downward therefrom.

The polymer overlay material 1140 further includes a cut-out or slot 1103 on the left side. This cut-out or slot 1103 allows for the insertion of a sheet of material 1141. Further, the cut-out or slot 1103 allows for a user to identify an indication area 1101 shown as a dashed box to be exposed. The indication area 1101 may or may not be printed on the sheet of material 1141. The indication area 1101 may expose the indicators disposed on the sheet of material, as discussed above with reference to FIG. 1. The indication area 1101 may also allow for a user to mark which subregion to extracted after insertion of the sheet of material 1141 and subsequent scanning by the optical sensor.

In some embodiments, several indicators have been made on the sheet of material. Some sample indicators or indication markings, 1105, 1107, 1109, and 1111 are provided. The indication marking 1105, for example, illustrates an indication marking to guide the digitization of the corresponding subregion, for example line 1 as shown in FIG. 11 corresponding to indication marking 1105. Likewise, the indication marking 1107, 1109, and 1111 illustrate examples of indication markings with corresponding subregions that may be extracted, such as indication marking 1107 and the corresponding line 2 as shown in FIG. 11, indication marking 1109 and the corresponding line 3 as shown in FIG. 11, and indication marking 1111 and the corresponding line 4 as shown in FIG. 11, to be digitized and extracted after scanning.

The text indicated by reference line 1113 as line 5 illustrate information that will be scanned by the optical device since it is within the scannable region, but the information will not be digitized because no marking in the indication area 1101 has been made. The indication markings 1105, 1107, 1109, and 1111 illustrate different markings that may be made within the indication area 1101 to have the corresponding subregions digitized. In some embodiments, the shape of the marking, including whether an indication marking to be filled in, such as a blank circle to be bubbled in, is printed on the sheet of material may be immaterial in illustrating which subregions should be digitized.

The indication area 1101 is scanned by the optical sensor whether the sheet of material 1141 includes printed indicators on the sheet of material, the printed indicators are marked or unmarked, or if the indication area 1101 is left blank. The subregion that is extracted is determined based on a user marking within the indication area 1101. Indication markings that have corresponding subregion extracted, similar to that described above with reference to FIG. 7, are markings that have 30% or more of the pixels in the expected location darkened. The polymer overlay material 1140 allows a user to use conventional sheets of material that do not include fiducial marks 1106, or printed indicators, similar to those described with reference to FIG. 1.

In use, a sheet of material 1141 may be disposed under the polymer overlay material 1140 following the insertion arrow 1115. A user may mark within the indication area 1101 to indicate subregions to be extracted. The sheet of material 1141 may include printed indicators, may be left blank and filled in after insertion, or may be blank and filled in before insertion. After insertion. the optical sensor will sense the fiducial marks 1106 and scan the scannable region. The application will digitize any markings or information made on the sheet of material 1141 within the scannable region and extract any corresponding subregions where an indication marking, such as indication marking 1105 and the corresponding line 1, has been made within the indication area 1101.

The information scanned may be digitized and extracted to save and/or generate a workflow or organization tool, an email, a calendar notice, a social media post, a study aid, a task, a reminder, a note, a text message, or short message service communication, or a listing, among other digital work products.

The folder 1100 with a polymer overlay material 1140 may also include at least one opening 1119. The opening 1119 may be used to connect the folder 1100 to other products, such as other products having three-ring securement structures.

The embodiments described above with reference to FIG. 11 may utilize one or more devices, communication circuitry, memory, optical sensor, and mobile application, among other options connected to the processor. Accordingly, the illustrative embodiment shown in FIG. 11 may be scanned to digitize and extract markings and information made within the scannable region similar to that described above with reference to FIGS. 1 and 2.

Figure 12:
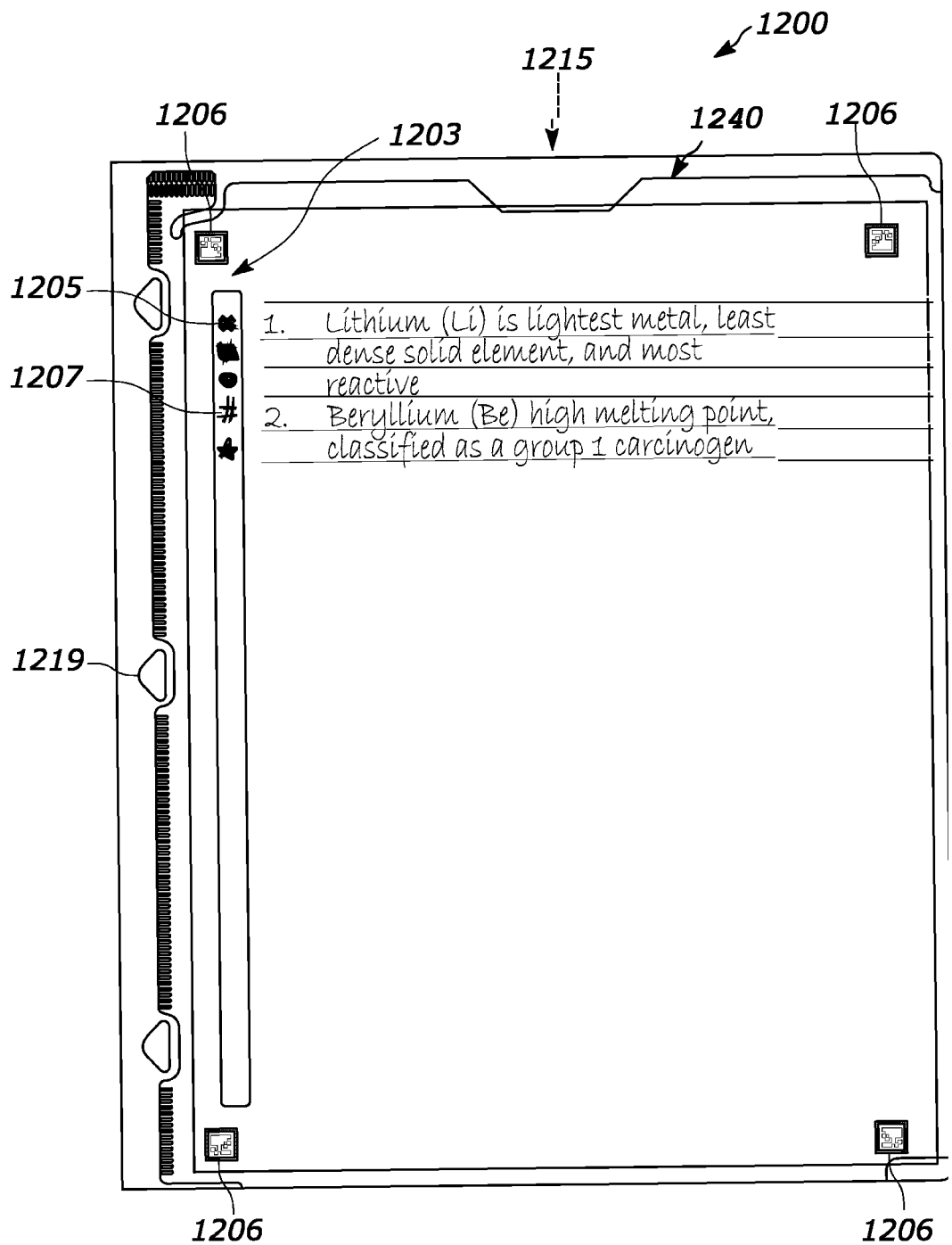
FIG. 12 illustrates another embodiment having a polymer overlay material on a face of a folder to be scanned by a device, the polymer overlay material having fiducial marks arranged in corners thereof and forming a first slot allowing for vertical insertion of a sheet of material and a second slot or opening to allow for selection of an indication area while the sheet of material is under the polymer overlay material.

Referring to FIG. 12, a folder 1200 having a polymer overlay material 1240 is illustrated on the face of the folder creating a pocket structure. The polymer overlay material 1240 allows for the vertical insertion, as illustrated by insertion arrow 1215, of a sheet of material underneath the polymer overlay material 1240, creating a pocket structure. The polymer overlay material 1240 includes at least one fiducial mark 1206, similar to those described above with reference to FIG. 1, in the corners of the polymer overlay material 1240. The fiducial marks 1206 allow for an indication of the scannable region of the sheet of material inserted underneath the polymer overlay material 1240. The polymer overlay material 1240 further includes a slot and indication area 1203 on the left side.

The slot and indication area 1203 allow a user to create an indication marking and corresponding subregion 1205 and 1207. The slot and indication area 1203 may align with indicators printed onto the sheet of material, similar to the sheets of material discussed above with reference to FIG. 1, or, in some embodiments, may allow for a visual indication of the indication area 1203 to be marked to indicate which subregion of the sheet of material should be digitized. In some embodiments, the polymer overlay material 1240 is attached to the face of the folder 1200 substantially on three sides, such that the sheet of material may be inserted along the insertion arrow 1215 using the fourth side, in some embodiments, the top side. Because the polymer overlay material 1240 is attached to the folder 1200 on three sides, the slot and indication area 1203 is a region cut-out from the polymer overlay material 1240, and as opposed to FIG. 11, is not a space for inserting a sheet of material.

In some embodiments, the sheet of material disposed within the scannable region, as discussed above, is scanned using the optical sensor. The example indication markings and corresponding subregions 1205 and 1207 are extracted by the application. The indication markings 1205 and 1207 may be made before or after insertion of the sheet of material since the slot and indication area 1203 is an opening in the polymer overlay material 1240. The indication markings and corresponding subregions 1205 and 1207 are digitized if, similar to that described above with reference to FIG. 7, 30% or more of the pixels in the expected location are darker or darkened.

The polymer overlay material 1240 allows for a user to use conventional sheets of material that do not include the fiducial marks. Because the fiducial marks 1206 are included on the polymer overlay material 1240, and the indication area 1203 does not required indicators, a user may insert any sheet of material that may fit underneath the polymer overlay material 1240 to be scanned.

The folder 1200 with a polymer overlay material 1240 may also include at least one opening 1219. The opening 1219 may be used to connect the folder 1200 to other products, such as other products having three-ring securement structures.

The embodiments described above with reference to FIG. 12 may utilize one or more devices, communication circuitry, memory, optical sensor, and mobile application, among other options connected to the processor. Accordingly, the illustrative embodiment shown in FIG. 12 may be scanned to digitize and extract markings and information made within the scannable region similar to that described above with reference to FIGS. 1 and 2.

Figure 13:
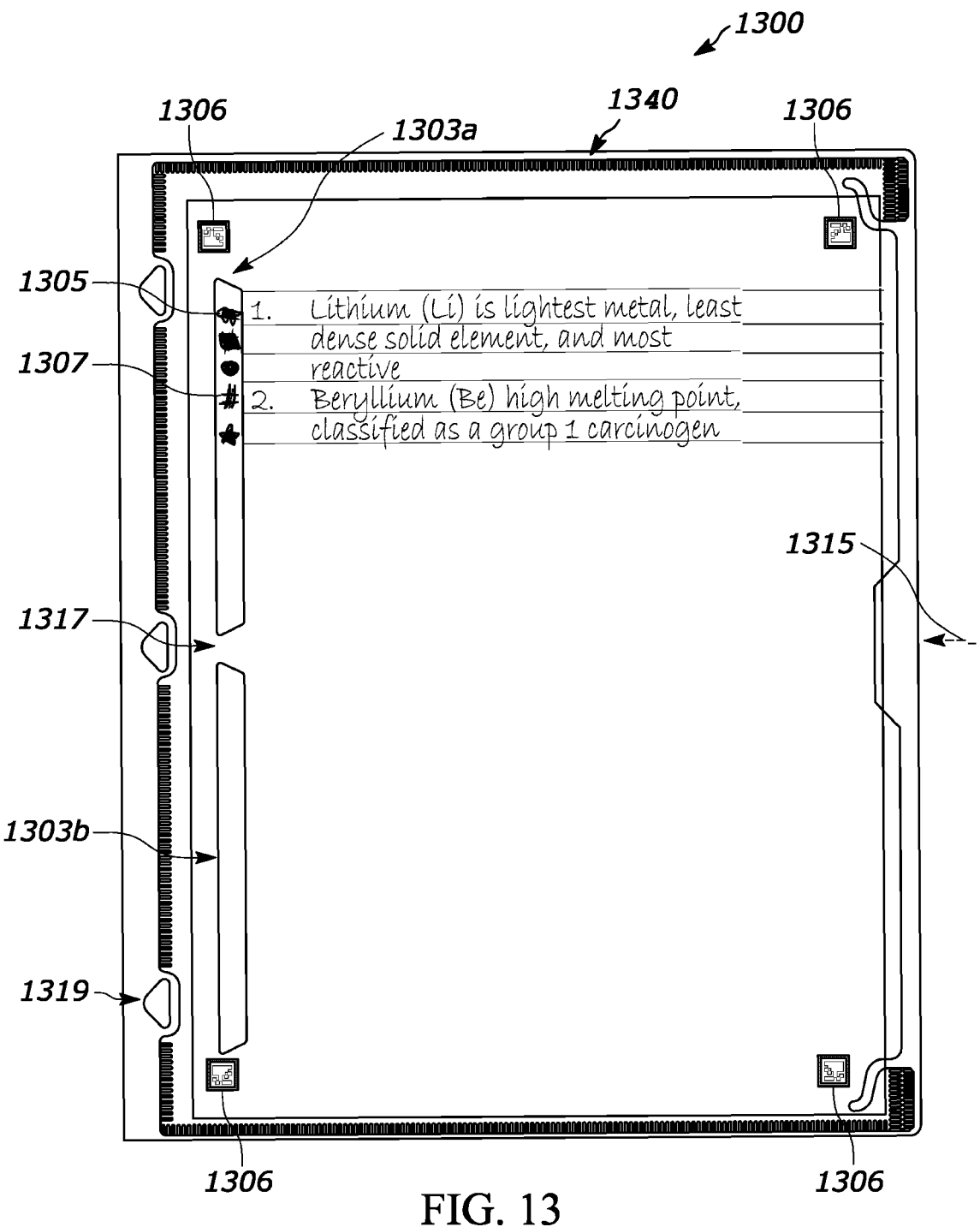
FIG. 13 illustrates another embodiment having a polymer overlay material on a face of a folder to be scanned by a device, the polymer overlay material having fiducial marks arranged in corners thereof and configured to form a slot to allow for right-side horizontal insertion of a sheet of material, and openings on a left-side thereof to allow for selection of an indication area while the sheet of material is under the polymer overlay material.

Referring to FIG. 13, the illustrated embodiment is similar to FIG. 12. In some embodiments, the slot and indication area 1303a and 1303b are two separate regions connected by a bridge region 1317. In some embodiments, the sheet of material is inserted horizontally form the right as indicated by the insertion arrow 1315. The one or more fiducial marks 1306 are disposed in the corners of the polymer overlay material 1340. The polymer overlay material 1340 is attached to the folder 1300 on three sides. Similar to FIG. 12, the slot and indication area 1303a and 1303b is an open region within the polymer overlay material 1340 and is not intended as an insertion region.

In some embodiments, the slot and indication area 1303a and 1303b are multiple cut-outs or slots. The bridge region 1317 may aid in avoiding the polymer overlay material 1340 from catching, ripping, or tearing on other items. Beyond the structural difference of multiple cut-outs for the slot and indication area 1303a and 1303b, the slot and indication area 1303a and 1303b function as described above. In use, the optical sensor scans a continuous area as illustrated by the dashed region of FIG. 11.

Indication markings and corresponding subregions 1305 and 1307 are similar to those described above with reference to FIGS. 11 and 12. Likewise, the at least one opening 1319 are similar to that described above with reference to FIGS. 11 and 12.

The embodiments described above with reference to FIG. 13 may utilize one or more devices, communication circuitry, memory, optical sensor, and mobile application, among other options connected to the processor. Accordingly, the illustrative embodiment shown in FIG. 13 may be scanned to digitize and extract markings and information made within the scannable region similar to that described above with reference to FIGS. 1 and 2.

Figure 14:
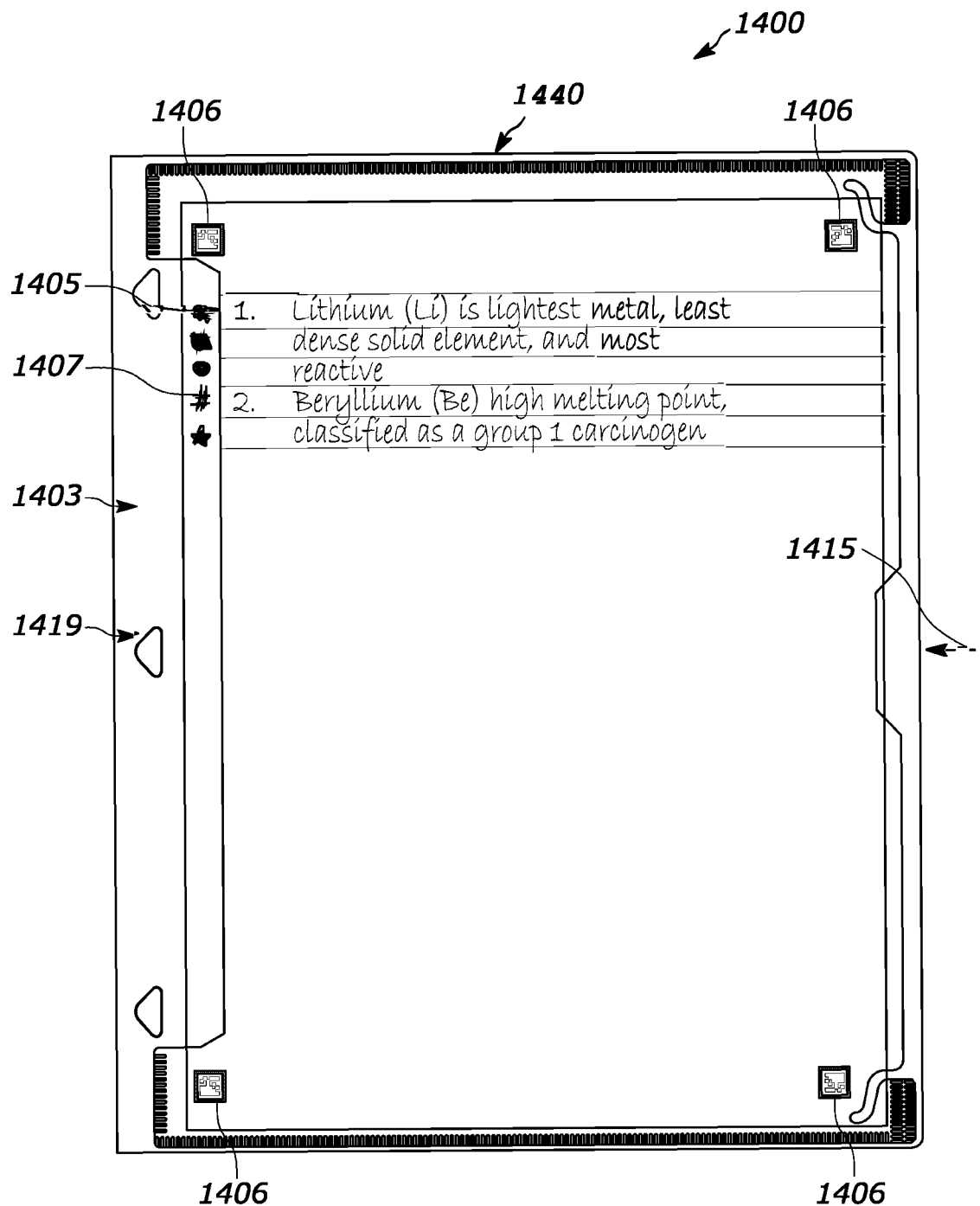
FIG. 14 illustrates another embodiment, similar to the polymer overlay material of FIG. 13 and including a continuous left-side slot to allow for selection of an indication area while the sheet of material is under the polymer overlay material.

Referring to FIG. 14, a folder 1400 having a polymer overlay material 1440 on the surface of the folder 1400 creating a pocket structure is illustrated. In some embodiments, the polymer overlay material 1440 is attached to the folder 1400 substantially on two sides, the top and bottom. The left and right side may have partial attachment to avoid catching or tearing of the polymer overlay material 1440, but are substantially unattached to allow for the insertion of material from the sides. In the embodiment shown in FIG. 14, the sheet of material is inserted from the right side as indicated by the insertion arrow 1415. The left side includes a slot and indication area 1403, similar to that described above with reference to FIG. 11. The slot and indication area 1403 allows for a user to indicate which subregion, such as the indication markings and corresponding subregions 1405 and 1407, to be scanned and digitized.

Indication markings and corresponding subregions 1405 and 1407 are similar to those described above with reference to FIGS. 11, 12, and 13. Likewise, the at least one opening 1419 are similar to that described above with reference to FIGS. 11, 12, and 13.

Figure 15:
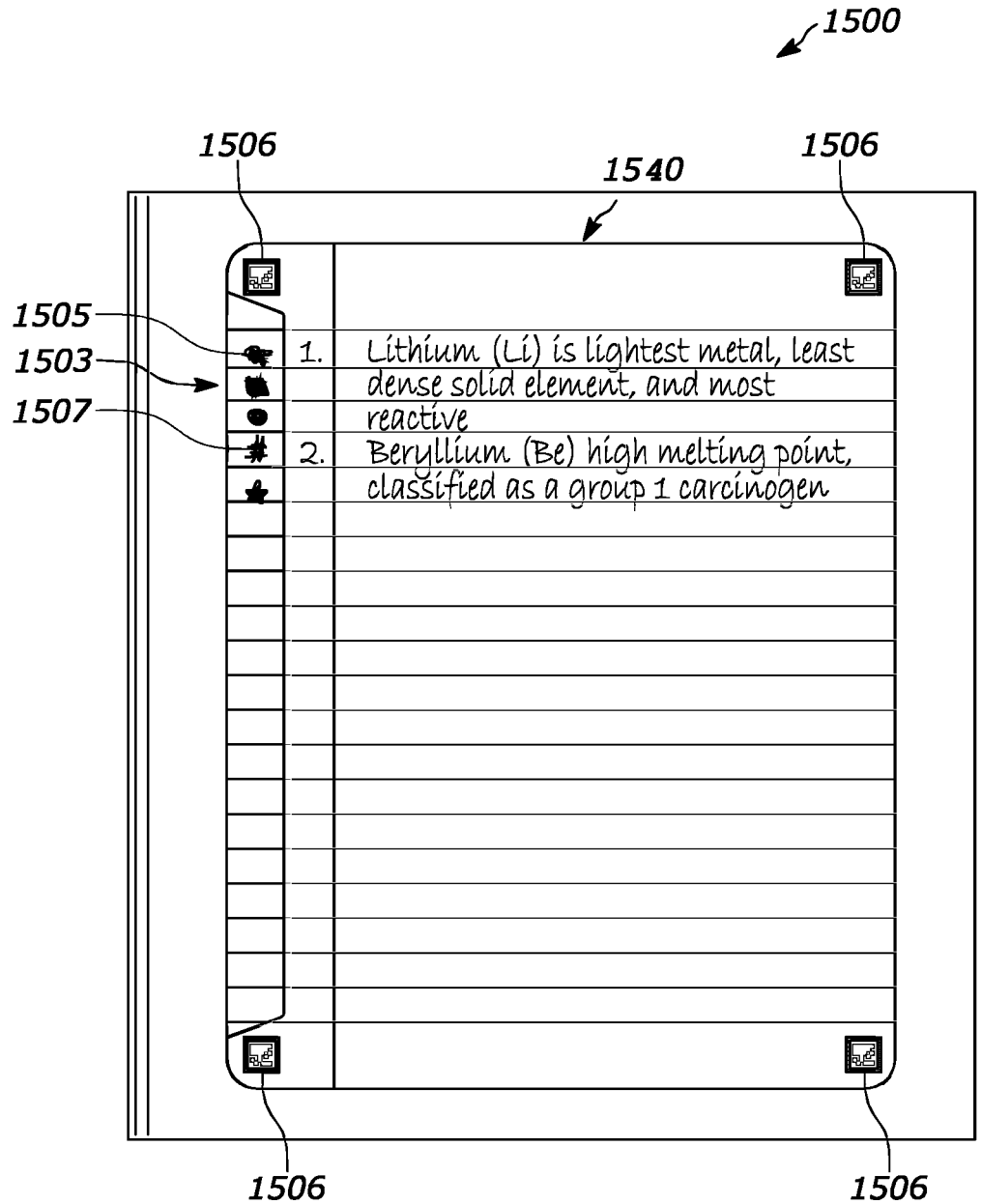
FIG. 15 illustrates another embodiment having a polymer overlay material disposed within a face of a binder to be scanned by a device, the polymer overlay material having fiducial marks arranged in corners thereof and a slot to allow for selection of an indication area while the sheet of material is under the polymer overlay material.

Referring to FIG. 15, a binder 1500 having a polymer overlay material 1540 is illustrated. In some embodiments, the polymer overlay material 1540 may be disposed on the front surface of the binder 1500 or within the front surface of the binder 1500. The polymer overlay material 1540 may be disposed as a pocket opening on the inside top edge of a binder cover. The sheet of material may be inserted from the top. The slot and indication area 1503, the fiducial marks 1506, and the indication markings and corresponding subregions 1505 and 1507 are similar to those described above with reference to FIGS. 11 and 14.

Figure 16:
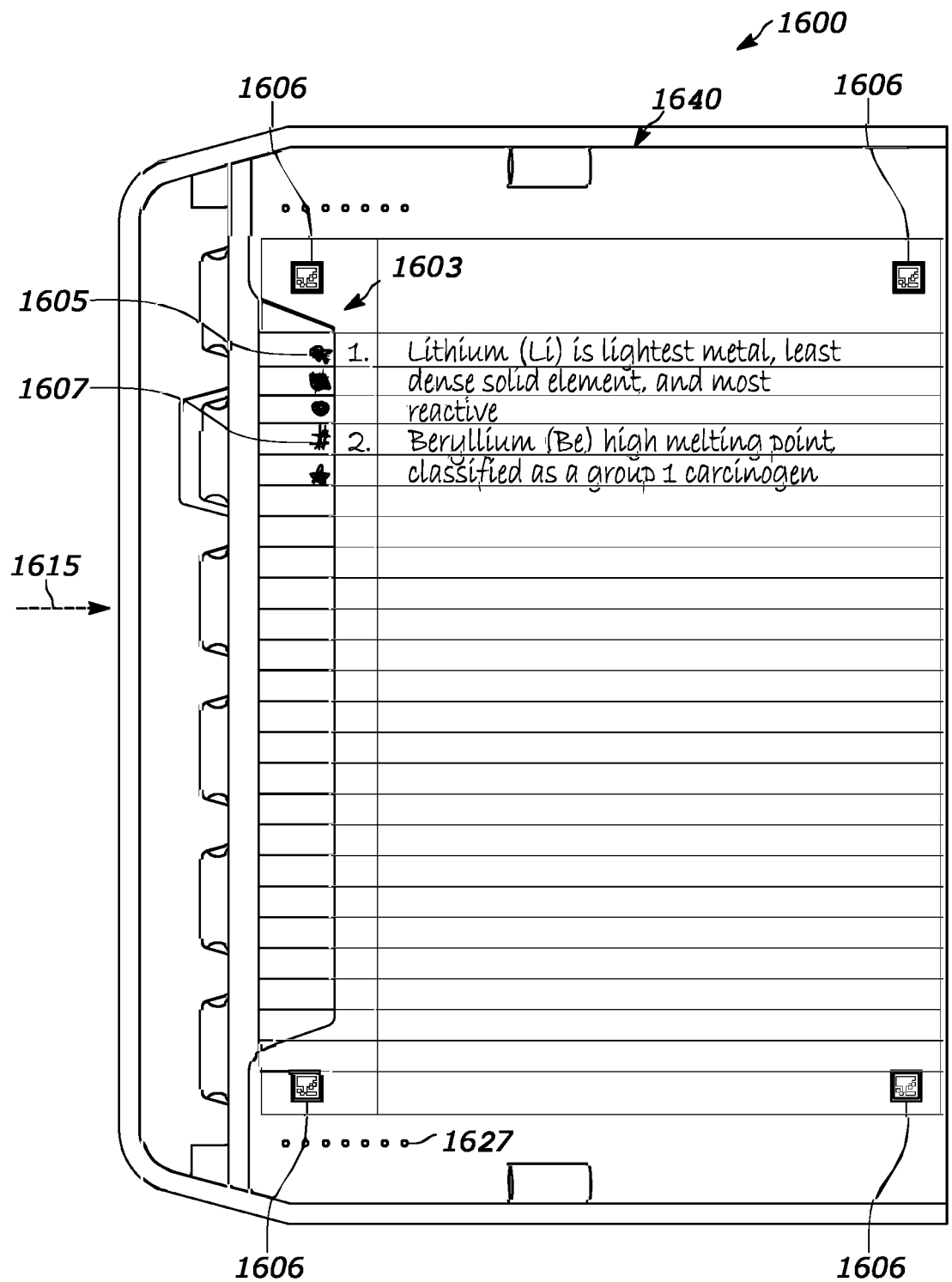
FIG. 16 illustrates another embodiment having a polymer overlay material on a face of a filer, the polymer overlay material having fiducial marks arranged in corners thereof and configured to form a slot to allow for left-side horizontal insertion of a sheet of material and selection of an indication area while the sheet of material is under the polymer overlay material.

Referring to FIG. 16, a filer 1600 having a polymer overlay material 1640 is illustrated. In some embodiments, a similar structure as discussed in FIG. 11 is used. The polymer overlay material 1640 is disposed on the surface of the filer 1600 having a slot and indication area 1603 on the left side to allow for the horizontal insertion of a sheet of material as indicated by insertion arrow 1615. The filer 1600 may include alignment structures 1627 disposed on at least one end of the filer 1600 and polymer overlay material 1640. The alignment structures 1627 may aid the sheet of material to be substantially aligned with the scannable region between the fiducial marks 1606. The alignment structure 1627 may be a physical and/or visual alignment tool, such as e.g., a single or multiple rows of dots, lines, or other welded or printed structures that connect the polymer overlay material 1640 to the front surface of the filer 1600. The filer 1600 may include one or more dividers or separate pocket regions within. The filer 1600 may include an expandable filer with multiple pockets, including an according style filer. The slot and indication area 1603, the fiducial marks 1606, and the indication markings and corresponding subregions 1605 and 1607 are similar to those described above with reference to FIGS. 11 and 14. those described above with reference to FIGS. 11 and 14.

Figure 17:
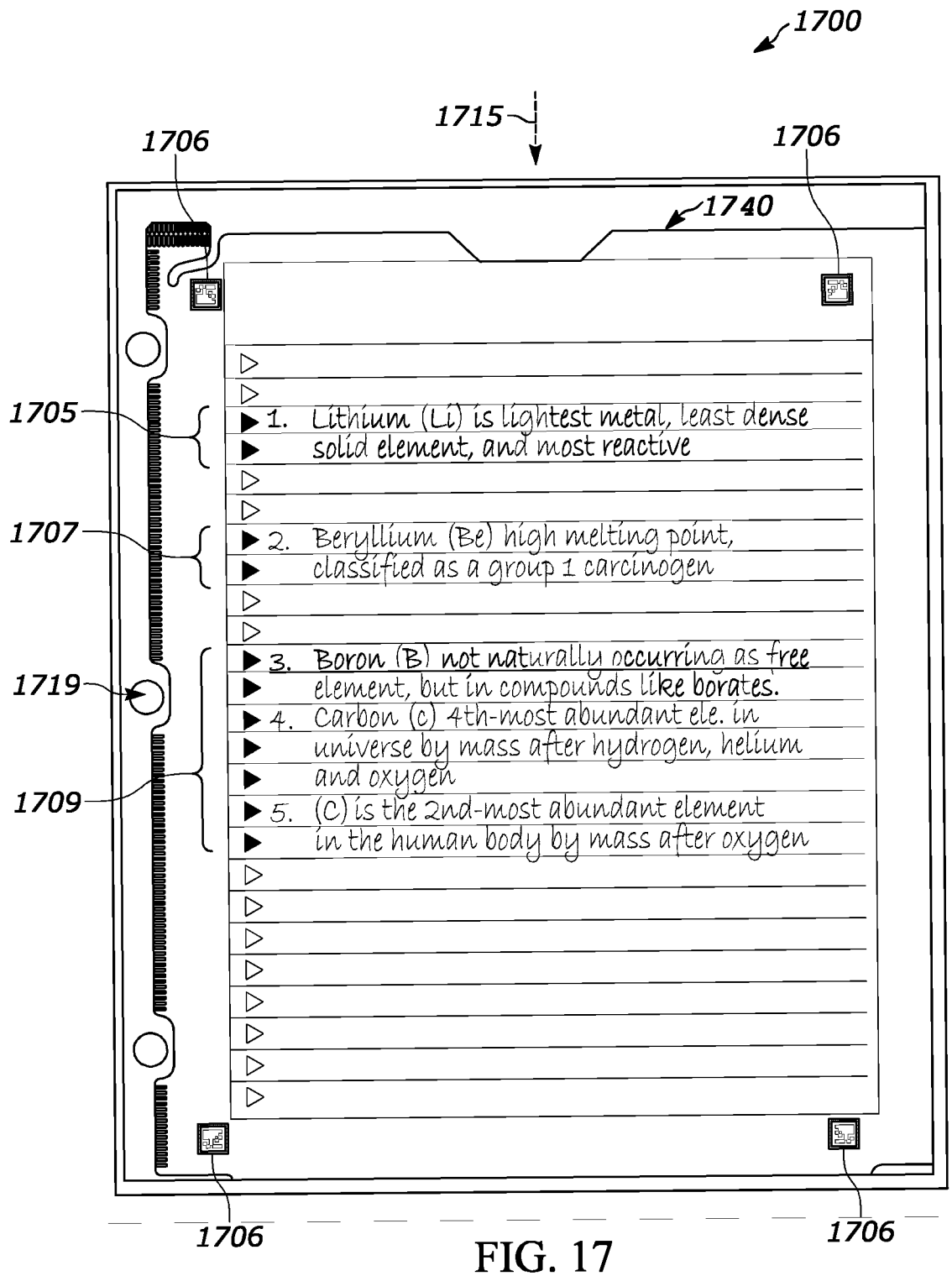
FIG. 17 illustrates another embodiment having a polymer overlay material on a face of a folder, the polymer overlay material having fiducial marks arranged in corners thereof and a slot adjacent an edge of the folder to allow for vertical insertion of a sheet of material.

Referring to FIG. 17, a folder 1700 having a polymer overlay material 1740 disposed on the surface of the folder 1700 creating a pocket structure is illustrated. In some embodiments, the fiducial marks 1706 are disposed in the corners of the polymer overlay material 1740. A sheet of material, similar to that described above with reference to FIG. 1, may be inserted underneath the polymer overlay material 1740 from the top, as indicated by insertion arrow 1715. The sheet of material may include printed indicator outlines disposed on one side for a user to mark which subregions should be digitized after scanning.

In some embodiments, the indicator markings and subregions 1705, 1707, and 1709 have filled in indicator markings meaning that the subregions will be digitized and extracted. The fiducial marks 1706 and at least one opening 1719 are similar to those described above with reference to FIGS. 11 to 14.

Figure 18:
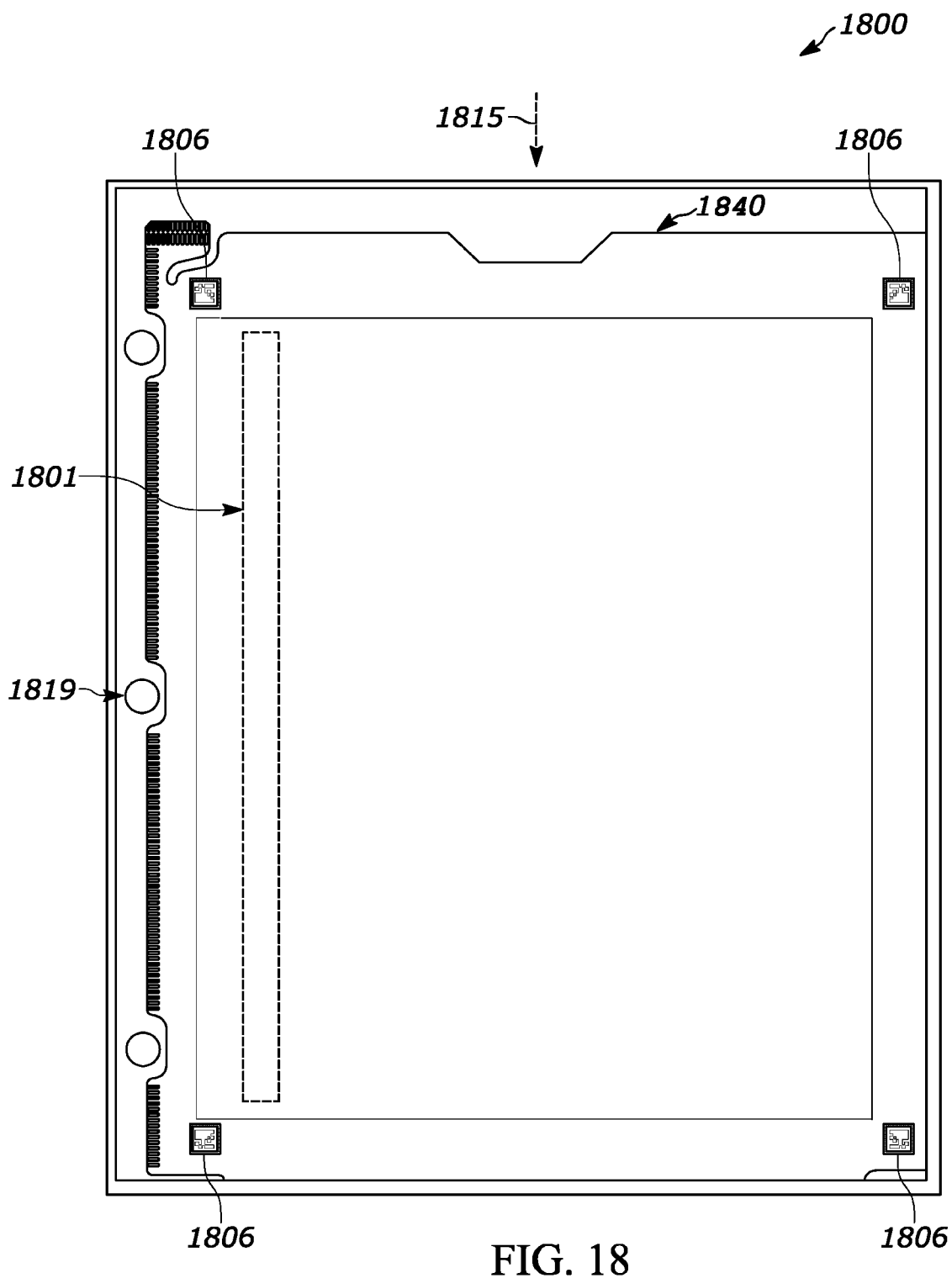
FIG. 18 illustrates another embodiment of a polymer overlay material on a face of a folder, the polymer overlap material having fiducial marks arranged in corners thereof and a slot adjacent an edge of the folder to allow for vertical insertion of a sheet of material.

Referring to FIG. 18, a folder 1800 having a polymer overlay material 1840 disposed on the surface of the folder 1800 creating a pocket structure is illustrated. The embodiment illustrated in FIG. 18 is similar to FIG. 17. In some embodiments, an indication area 1803 is shown for illustrative purposes only, though in another embodiment, the indication area may be printed or otherwise disposed onto the polymer overlay material 1840 guiding users to the area where the optical sensor will be scanning to determine which subregions of the scannable region to extract. A sheet of material may be inserted from the top as indicated by insertion arrow 1815. The sheet of material may include printed indication marking outlines, similar to those discussed above with reference to FIG. 17. The sheet of material may include user markings that are disposed inside of the indication area 1803 once inserted.

In some embodiments, a user may use a dry erase marker, or other non-permanent or semi-permanent marking means to create an indication marking, similar to those described above having 30% of the pixels in the expected location darkened, to be scanned, digitized, and extracted. A combination of indication markings made on the sheet of material before insertion with indication markings on the polymer overlay material 1840 may be used.

The embodiments described above with reference to FIGS. 14, 15, 16, 17, and 18 may utilize one or more devices, communication circuitry, memory, optical sensor, and mobile application, among other options connected to the processor. Accordingly, the illustrative embodiment shown in FIGS. 14, 15, 16, 17, and 18 may be scanned to digitize and extract markings and information made within the scannable region similar to that described above with reference to FIGS. 1 and 2.

Figure 19:
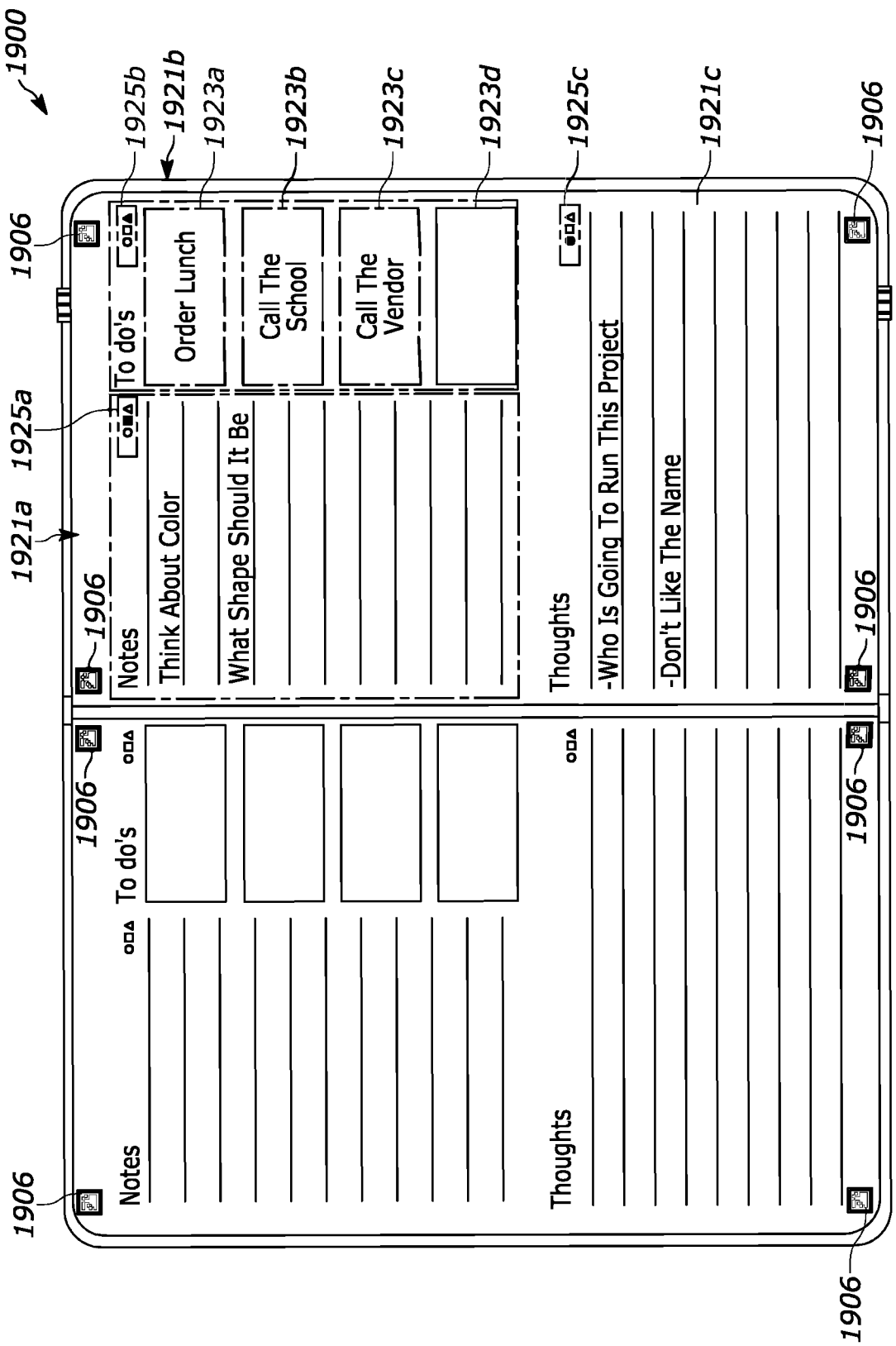
FIG. 19 illustrates another embodiment with a component, such as a notebook with sheets of material, the sheets having fiducial marks arranged in corners thereof and pre-defined subsubsections and designation regions within subsection.

Referring to FIG. 19, a notebook 1900 including two pages having fiducial marks 1906 in the corners thereof is illustrated. Each page includes pre-defined subsections

1921a, 1921b, and 1921c. The pre-defined subsections 1921a, 1921b, and 1921c may also include a corresponding designation region 1925a, 1925b, and 1925c having one or more designation indicators.

While the pre-defined subsections 1921a and 1921b are illustrated as having a dashed box around each subsection, the dashed box is for illustrative and discussion purposes only and may or may not be included on the page of the notebook 1900.

In some embodiments, as illustrated by subsection 1921b, each subsection may have one or more subregions within the subsection. For example, the subsection 1921b includes subregions 1923a, 1923b, 1923c, and 1923d. Similar to the dashed box surrounding the subsections 1921a and 1921b, the subregions 1923a, 1923b, 1923c, and 1923d within subsection 1921b include a dashed box surrounding each subregion. The dashed box is for illustrative and discussion purposes. Boxes within the subsection may or may not be printed to designate subregions.

Each pre-defined subsection 1921a, 1921b, and 1921c may include a designation region having corresponding designation indicators 1925a, 1925b, and 1925c. The designation region, much like the indication area from FIG. 11, may include printed designation indicator outlines to be filled in, such as the shapes shown in the designation region and designation indicators 1925a, 1925b, and 1925c. A user may be able to set a specified save location or function for the different shapes shown in the designation region and designation indicators 1925a, 1925b, and 1925c.

The designation indicators may save the digitized and extracted information as a workflow or organization tool, an email, a calendar notice, a social media post, a study aid, a task, a reminder, a note, a text message, a short message service communication, or a listing, among other digital work products.

The designation indicators, such as the shapes shown in the designation region 1925a, 1925b, and 1925c, similar to the indicators discussed above with reference to FIG. 17, may be printed on the page or sheet of material. While not required, having printed indicators allows for a user to easily identify which subsection will be extracted and/or what save location will be used. When the optical sensor scans the designation region, such as 1925a, the application and/or device detects markings within certain zones of the designation regions. These zones may be illustrated by the shapes for ease of use and visual indication to the user, however the shapes are not required.

In some embodiments, marking more than one zone within the designation region may result in individually saving the information in both save locations. This may allow a user to save the same information in different places at the same time, without needing additional scans.

Examples of save locations corresponding to different zones within the designation region may allow a user to save or send markings or information, such as notes, to one folder, create a digital list of to do's, and create a log of thoughts. Digitizing the information from the notebook allows a user to access the information via the device, without having the notebook or sheet of material with them.

In use, the optical sensor, similar to that described above, may scan a page or sheet of material, including any markings or information located within the scannable area covered by the fiducial marks, as discussed above. The optical device may digitize and extract any markings made within each pre-defined subsection, such as pre-defined subsections 1921a, 1921b, and 1921c. Similar to above, because there are no markings present in the subsection, the optical sensor may scan that subsection, but no information will be digitized or extracted. Once scanned by the optical sensor, the markings or information may be digitized and extracted.

If a marking is made in the designation region, such as 1925a for example, the device and/or application may process and save the digitized and extracted markings and/or information within the pre-defined subsection 1921a according to the specified save location chosen by the user within the application. If a marking is made within the designation region 1925a, such as described with reference to FIG. 7, having more than 30% of the pixels in the expected location darker or darkened, the information in the subsection will be processed and saved according to the designation function marked. In some embodiments, the information and/or markings digitized and extracted will be saved to the device and/or application, and a copy will be saved according to the specified save location corresponding to the marking made in the designation region.

Figure 20:
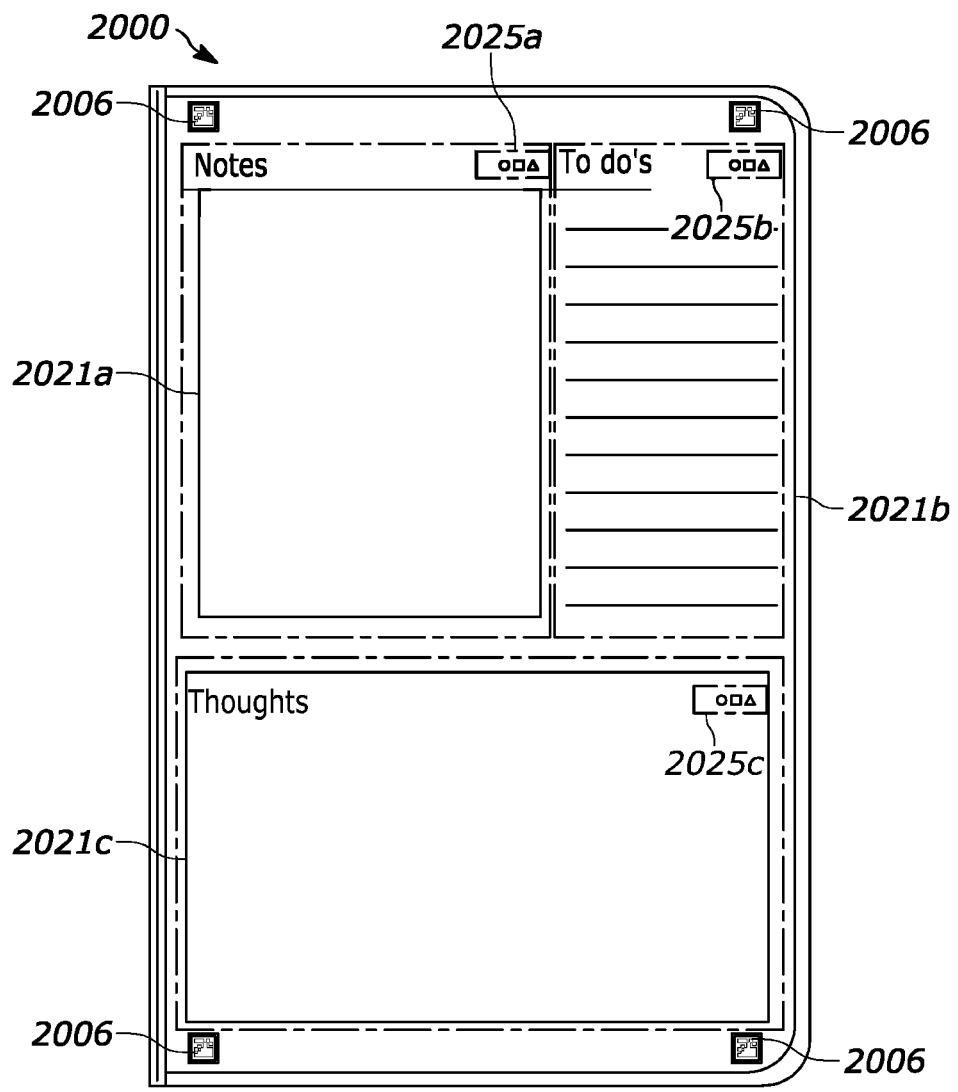
FIG. 20 illustrates another embodiment with a dry erase board to be scanned by a device, having fiducial marks arranged in corners thereof and pre-defined subsections and designation regions within each subsection.

Referring to FIG. 20, a dry erase board 2000 including fiducial marks 2006 in the corners thereof are illustrated. The dry erase board 2000 may include pre-defined subsections 2021a, 2021b, and 2021c, and corresponding designation regions 2025a, 2025b, and 2025c. The subsections and designation regions similar to those described above with reference to FIG. 19. In some embodiments, a user may be able to make digitized copies of notes and markings made on the dry erase board 2000. This may allow a user to make notes, save them, then erase the notes or markings for further user of the dry erase board 2000. In use, the embodiment illustrated in FIG. 20 is similar to FIG. 19 described above having designation regions having zones therein for designating a certain save location.

Figure 21:
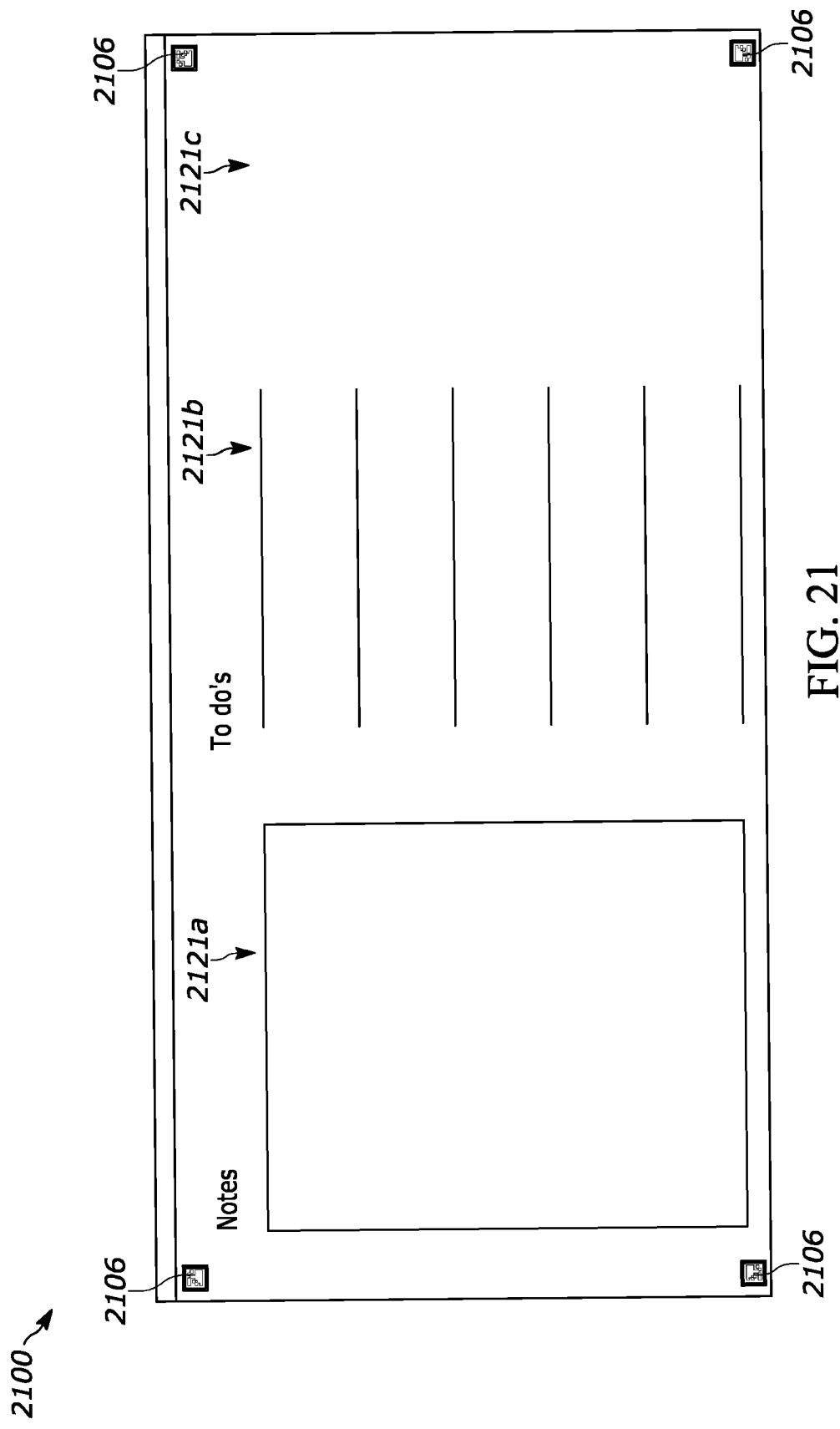
FIG. 21 illustrates another embodiment with a whiteboard with fiducial marks arranged in corners thereof and pre-defined subsections.

Referring to FIG. 21, a white board 2100 including fiducial marks 2106 in the corners thereof are illustrated. The white board 2100 may include pre-defined subsections 2021a, 2021b, and 2021c. The subsections similar to those described above with reference to FIG. 19 are shown without having a border surrounding the subsections. In some embodiments, a user may be able to make digitized copies of notes and markings made on the white board 2100. This may allow a user to make notes, save them, then erase the notes or markings for further user of the white board 2100.

Figure 22:
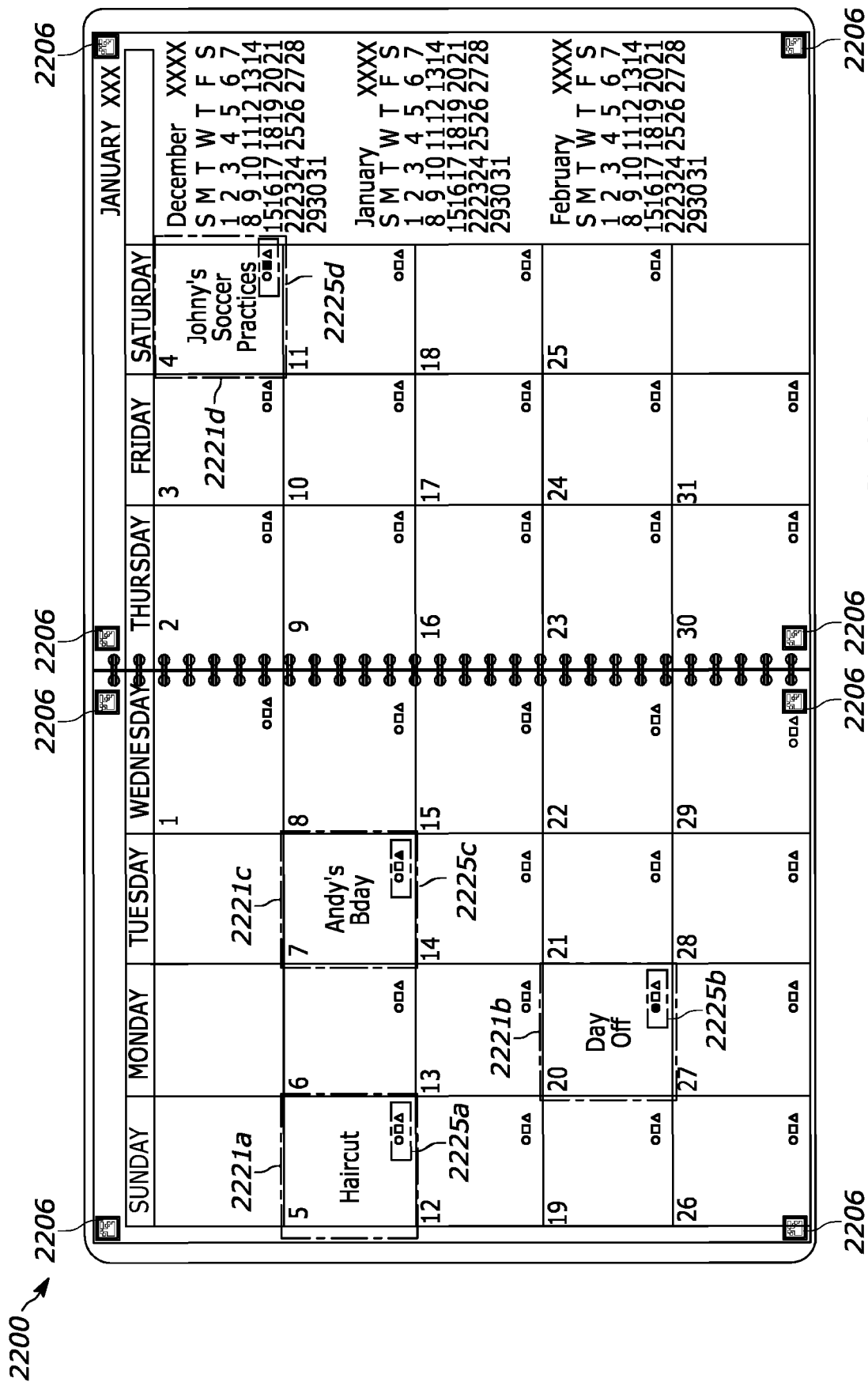
FIG. 22 illustrates another embodiment with a calendar with sheets of material, that have fiducial marks arranged in corners thereof and pre-defined subsections and designation regions within subsections.

Referring to FIG. 22, a calendar 2200 including two pages having fiducial marks 2206 in the corners thereof are illustrated. Each page includes pre-defined, subsections, as illustrated by 2221a, 2221b, 2221c, and 2221d. The pre-defined subsections may also include a designation region, 2225a, 2225b, 2225c, and 2225d, having one or multiple designation indicators or zones.

In some embodiments, each day on the calendar is a pre-designated subsection for purposes of scanning and extracting data. When the optical sensor scans the page, if a day, or subsection, includes a marking, the markings or information within the subsection is digitized, and extracted. This allows for the user to scan and save information only on the days, or subsections, that include markings. Each subsection, or day, may also include a designation region, 2225a, 2225b, 2225c, and 2225d. The designation regions 2225a, 2225b, 2225c, and 2225d are similar to those described above with reference to FIG. 19.

Referring to the embodiment and corresponding markings illustrated in FIG. 22, for subsection 2221a, the optical sensor would the subregion, digitized, and extracted the information within the subsection, and save a copy within the application. Since there are no markings made in the designation region, the information would not be saved or sent to any other location. for subsection 2221b, 2221c, and 2221d, the information within the respective subregions would be scanned, digitized, and extracted. Unlike subsection 2221a, the information within the subsection would be sent and/or saved to another location because of the marking within the designation regions 2225b, 2225c, and 2225d. Because different zones within the designation region have been marked the information may be sent or saved to different locations based on what the user set on the application.

In use, similar to that described above with reference to FIG. 19, the optical sensor may scan the page, including the information located within the area covered by the fiducial marks 2206. The device and/or application determines if any markings have been made within the subsections, 2221a, 2221b, 2221c, and 2221d for example. If a marking has been made in a subsection, that particular subsection may having the markings or information digitized and extracted by the application and/or device. If no markings are present in the subsection, the device and/or the application does not digitize and extract those subsections.

In some embodiments, a user may digitize a physical calendar. One designation indicator may create and save the information or markings included in the corresponding subsection as a reminder on a device. Further, subsequent scans of the calendar may update the digitized calendar if changes are made to the information in the subsection corresponding to a certain day.

The embodiments described above with reference to FIGS. 19, 20, 21, and 22 may utilize one or more devices, communication circuitry, memory, optical sensor, and mobile application, among other options connected to the processor. Accordingly, the illustrative embodiment shown in FIGS. 19, 20, 21, and 22 may be scanned to digitize and extract markings and information made within the scannable region similar to that described above with reference to FIGS. 1 and 2.

The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated. Further uses of singular terms such as "a," and "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

The use of any and all examples, or exemplary language (e.g., "such as") provided herein, is intended to illuminate the disclosure and does not pose a limitation on the scope of the disclosure. Any statement herein as to the nature or benefits of the disclosed device is not intended to be limiting. This disclosure includes all modifications and equivalents of the subject matter recited herein as permitted by applicable law. Moreover, any combination of the above-described elements in all possible variations thereof is encompassed by the disclosure unless otherwise indicated herein or otherwise clearly contradicted by context. No unclaimed language should be deemed to limit the disclosure in scope. Any statements or suggestions herein that certain features constitute a component of the claimed disclosure are not intended to be limiting unless reflected in the appended claims. Neither the marking of the patent number on any product nor the identification of the patent number in connection with any service should be deemed a representation that all embodiments described herein are incorporated into such product or service.

What is claimed is:

1. A system for digitizing and extracting information from a sheet of material, the system comprising:
    a sheet of material having a plurality of subregions, the sheet including a plurality of fiducial marks adjacent a periphery of the sheet and further including a plurality of indicators each corresponding with at least one of the plurality of subregions; and
    a device including a processor, communication circuitry, a memory, and an optical sensor, the processor of the device operably coupled to the communication circuitry, the memory, and the optical sensor and configured to cause the optical sensor to scan the sheet and generate an image thereof,
    wherein the processor is further configured to detect a boundary of the sheet based at least in part on detection of the fiducial marks, wherein the processor is further configured to identify a designated subregion based at least in part on detection of at least one marked indicator corresponding with the designated subregion and extract information from the designated subregion, and wherein the processor is further configured to detect multiple, sequentially marked indicators of the plurality of indicators and extract information from each subregion corresponding with those marked indicators as a single image.

2. The system of claim 1, wherein the fiducial marks comprise a machine-readable data matrix including encoded data, and wherein the processor is further configured to identify information associated with the sheet of material based at least in part on the encoded data.

3. The system of claim 2, wherein the information associated with the sheet of material includes at least one of:
    a reference indicative of a stock keeping unit of the sheet;
    a reference indicative of an orientation of the sheet;
    dimensions of the sheet;
    margins of the sheet;
    a type of the plurality of indicators included on the sheet; and
    locations of the plurality of indicators included on the sheet.

4. The system of claim 2, wherein the machine-readable data matrix comprises at least one of an AprilTag and a QR code.

5. A system for digitizing and extracting information from a sheet of material, the system comprising:
    a sheet of material having a plurality of subregions, the sheet including a plurality of fiducial marks adjacent a periphery of the sheet and further including a plurality of indicators each corresponding with at least one of the plurality of subregions, wherein the indicators are aligned along a longitudinal margin of the sheet and wherein the sheet comprises lined notebook paper and the plurality of subregions comprise one or more lines of the lined notebook paper; and
    a device including a processor, communication circuitry, a memory, and an optical sensor, the processor of the device operably coupled to the communication circuitry, the memory, and the optical sensor and configured to cause the optical sensor to scan the sheet and generate an image thereof, wherein the processor is further configured to detect a boundary of the sheet based at least in part on detection of the fiducial marks, and wherein the processor is further configured to identify a designated subregion based at least in part on detection of at least one marked indicator corresponding with the designated subregion and extract information from the designated subregion.

6. The system of claim 1, wherein the indicators comprise fillable shapes, and wherein the marked indicator is detected based at least in part on the fillable shape being at least partially filled by a user.

7. The system of claim 5, wherein the processor is further configured to detect multiple, sequentially marked indicators of the plurality of indicators and extract information from each subregion corresponding with those marked indicators as a single image.

8. The system of claim 5, wherein the information from the designated subregion is extracted by the processor as a cropped image.

9. The system of claim 1, wherein the processor is further configured to cause the communication circuitry to communicate the information extracted from the designated subregion to a remote server computer.

10. The system of claim 1, wherein the processor is further configured to generate a study aid based at least in part on the information extracted from the designated subregion, and wherein the processor is configured to store the study aid in the memory and wherein the study aid generated by the processor includes at least one of:
a single-sided digital notecard;
a double-sided digital notecard; and
an outline.

11. A notebook comprising:
a plurality of scannable pages, each page including:
a plurality of fiducial marks to facilitate identification of a peripheral boundary of the page, each of the plurality of fiducial marks comprising a machine-readable data matrix including encoded data indicative of information associated with the notebook;
a plurality of subregions; and
a plurality of indicators spaced along at least a portion of a length of each page, each of the plurality of indicators associated with and configured to identify at least one subregion of the plurality of subregions to facilitate extraction of information contained in the at least one subregion,
wherein one of the plurality of fiducial marks is positioned at a different corner of each page and wherein each page comprises lined notebook paper and the plurality of subregions comprise one or more lines of the lined notebook paper.

12. The notebook of claim 11, wherein the machine-readable data matrix comprises at least one of an AprilTag and a QR code.

13. The notebook of claim 11, wherein the information associated with the notebook includes at least one of:
a reference indicative of a stock keeping unit of the notebook;
a reference indicative of an orientation of the pages;
dimensions of the pages;
a margin of the pages;
a type of the indicators included on the pages; and
locations of the indicators included on the pages.

14. The notebook of claim 11, wherein each of the indicators comprises a fillable shape configured to be at least partially filled in by a user.

15. The notebook of claim 11, wherein the indicators are aligned along a longitudinal margin of each page.

16. The system of claim 5, wherein the fiducial marks comprise a machine-readable data matrix including encoded data, and wherein the processor is further configured to identify information associated with the sheet of material based at least in part on the encoded data.

17. The system of claim 16, wherein the information associated with the sheet of material includes at least one of:
a reference indicative of a stock keeping unit of the sheet;
a reference indicative of an orientation of the sheet;
dimensions of the sheet;
margins of the sheet;
a type of the plurality of indicators included on the sheet; and
locations of the plurality of indicators included on the sheet.

18. The system of claim 16, wherein the machine-readable data matrix comprises at least one of an AprilTag and a QR code.

19. The system of claim 5, wherein the indicators comprise fillable shapes, and wherein the marked indicator is detected based at least in part on the fillable shape being at least partially filled by a user.

20. The system of claim 5, wherein the processor is further configured to cause the communication circuitry to communicate the information extracted from the designated subregion to a remote server computer.

* * * * *

UNITED STATES PATENT AND TRADEMARK OFFICE
CERTIFICATE OF CORRECTION

| | | |
|---|---|---|
| PATENT NO. | : 11,908,213 B2 | Page 1 of 1 |
| APPLICATION NO. | : 18/198685 | |
| DATED | : February 20, 2024 | |
| INVENTOR(S) | : Povish et al. | |

It is certified that error appears in the above-identified patent and that said Letters Patent is hereby corrected as shown below:

On the Title Page

In Item (57), under "ABSTRACT" in Column 2, Line 7, delete "indictors" and insert
-- indicators --, therefor.

Signed and Sealed this
Fifteenth Day of October, 2024

Katherine Kelly Vidal
*Director of the United States Patent and Trademark Office*